(12) United States Patent
Marzban et al.

(10) Patent No.: US 12,177,875 B2
(45) Date of Patent: Dec. 24, 2024

(54) SOFT INTERFERENCE PREDICTION IN A WIRELESS COMMUNICATIONS SYSTEM

(71) Applicant: QUALCOMM Incorporated, San Diego, CA (US)

(72) Inventors: Mohamed Fouad Ahmed Marzban, San Diego, CA (US); Wooseok Nam, San Diego, CA (US); Tao Luo, San Diego, CA (US); Taesang Yoo, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 17/653,996

(22) Filed: Mar. 8, 2022

(65) Prior Publication Data

US 2023/0292351 A1    Sep. 14, 2023

(51) Int. Cl.
| *H04W 72/541* | (2023.01) |
| *H04W 52/02* | (2009.01) |
| *H04W 72/044* | (2023.01) |
| *H04W 72/51* | (2023.01) |

(52) U.S. Cl.
CPC ..... *H04W 72/541* (2023.01); *H04W 52/0209* (2013.01); *H04W 72/044* (2013.01); *H04W 72/51* (2023.01)

(58) Field of Classification Search
CPC . H04W 72/541; H04W 72/044; H04W 72/51; H04W 42/00; H04W 52/0209
See application file for complete search history.

(56) References Cited

U.S. PATENT DOCUMENTS

| 6,519,705 | B1 * | 2/2003 | Leung | H04W 52/18 |
| | | | | 713/340 |
| 9,706,488 | B2 * | 7/2017 | Kim | H04W 40/244 |
| 2018/0049137 | A1 * | 2/2018 | Li | H04W 52/242 |
| 2018/0220340 | A1 * | 8/2018 | Ramachandra | H04W 36/08 |
| 2023/0292351 | A1 * | 9/2023 | Marzban | H04W 72/044 |

* cited by examiner

*Primary Examiner* — Raj Jain
(74) *Attorney, Agent, or Firm* — Patterson + Sheridan, LLP

(57) ABSTRACT

Certain aspects of the present disclosure provide techniques for wireless communications by a user equipment (UE), including receiving, from a network entity, one or more parameters for performing interference prediction at the UE; predicting, for each of at least one communications resource, a predicted interference at the UE, wherein the predicted interference comprises a plurality of probability values, each probability value of the plurality of probability values being associated with a different class of a plurality of classes, each class of the plurality of classes associated with a corresponding range of interference power; and sending, to the network entity, a report based on the predicted interference.

28 Claims, 13 Drawing Sheets

| 0 | 1 | 0 | 0 | 0 | 0 |
|---|---|---|---|---|---|

| 0.2 | 0.5 | 0.2 | 0.05 | 0.03 | 0.02 |
|---|---|---|---|---|---|

SOFT INTERFERENCE PREDICTION IN A WIRELESS COMMUNICATIONS SYSTEM

BACKGROUND

Field of the Disclosure

Aspects of the present disclosure relate to wireless communications, and more particularly, to techniques for interference reporting.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by a user equipment (UE), including receiving, from a network entity, one or more parameters for performing interference prediction at the UE; predicting, for each of at least one communications resource, a predicted interference at the UE, wherein the predicted interference comprises a plurality of probability values, each probability value of the plurality of probability values being associated with a different class of a plurality of classes, each class of the plurality of classes associated with a corresponding range of interference power; and sending, to the network entity, a report based on the predicted interference.

One aspect provides a method for wireless communications by a network entity, including transmitting, to a UE, one or more parameters for performing interference prediction at the UE, wherein the one or more parameters indicate a plurality of classes, each class of the plurality of classes associated with a corresponding range of interference power and receiving, from the UE, a report based on a predicted interference for at least one communications resource.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 6A illustrates example label data for training a neural network using one-hot encoding.

FIG. 6B illustrates example label data for training a neural network using soft encoding.

DETAILED DESCRIPTION

Figure 1:
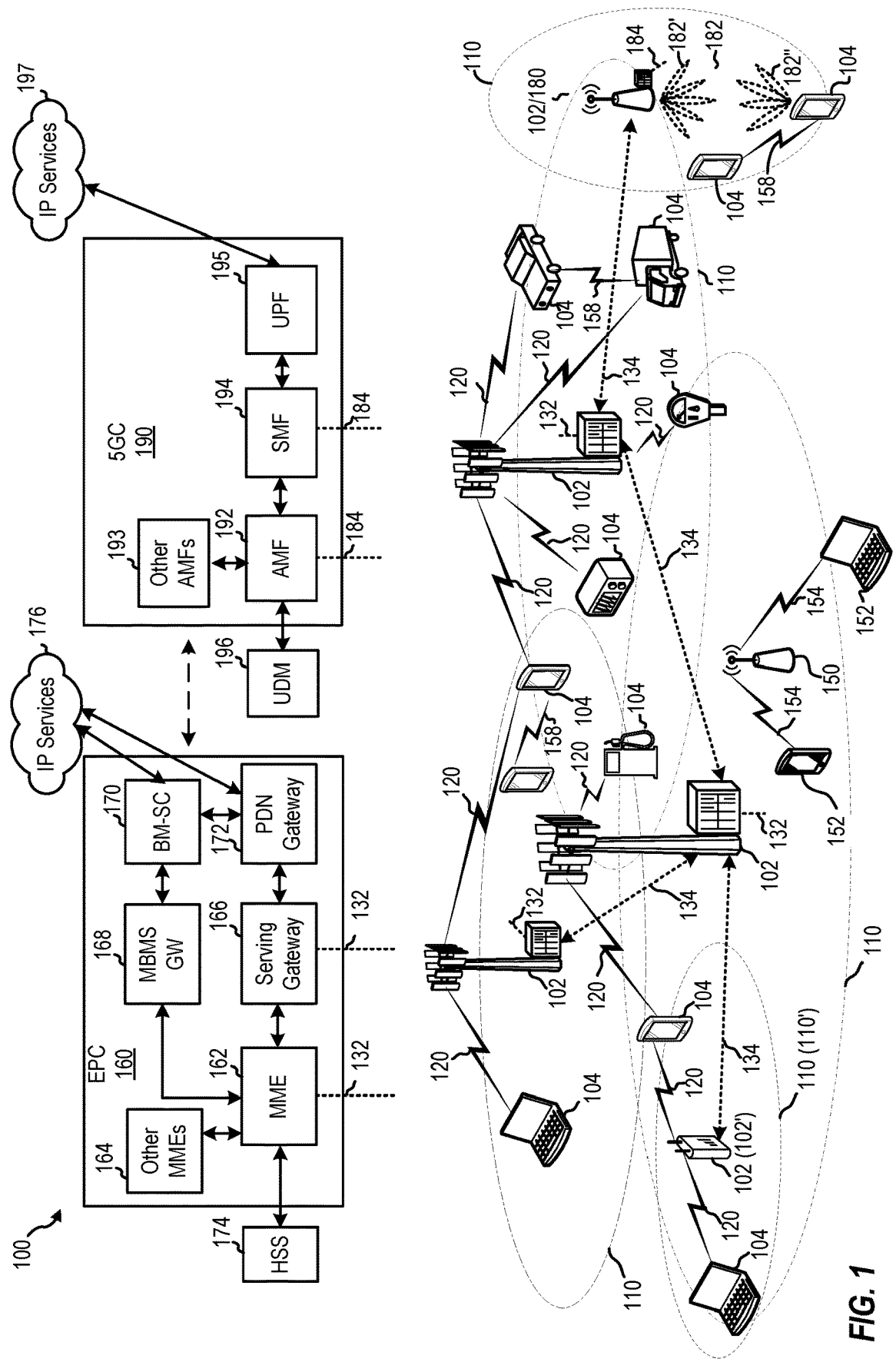
FIG. 1 depicts an example wireless communications network.

Aspects of the present disclosure provide apparatuses, methods, processing systems, and computer-readable mediums for soft interference prediction in a wireless communications system. For example, certain aspects relate to a network entity configuring a user equipment (UE) with parameters for performing soft interference prediction for one or more future communications resources (e.g., time, frequency, and/or spatial resources, such as associated with a particular resource block (RB), RB group (RBG), Tx beam, and/or Rx beam). Additionally, certain aspects relate to a UE performing soft interference prediction for the one or more future communications resources, and reporting results based on the prediction to the network entity. In certain aspects, reference to performing interference prediction herein (e.g., including soft interference prediction) can refer to performing interference prediction alone, or can refer to performing interference plus noise prediction. For example, in some cases, the prediction of interference, due to the difficulty of distinguishing between interference alone and noise, may be more accurately described as a prediction of the amount of interference and noise. Accordingly, in certain aspects, reference to a predicted interference herein can refer to predicted interference alone, or can refer to predicted interference plus noise.

In some wireless communications systems, such as 5G NR based systems, interference as experienced by different devices (e.g., user equipments (UEs), network entities, etc.) may vary significantly from device to device. For example, due to the flexibility of devices to transmit at different times, to use different beams for transmissions, etc., interference experienced at one device may vary significantly from interference experienced at another device at the same time. For example, 5G NR systems allow for communications to be scheduled in mini-slots, which are more flexible in start and end time than conventional slot communications. Further, in certain examples, bursts of transmission can start in time at any arbitrary symbol in an enhanced mobile broadband (eMBB) slot. In certain examples, UEs are able to transmit unscheduled uplink transmissions, without an uplink grant. In yet another example, reference signal patterns may be highly adaptive, such as depending on number of antenna ports, delay tolerance, Doppler spread, etc. Therefore, it can be difficult to design a conventional algorithm or model that is capable of predicting interference as observed at different UEs in the communications system.

Accordingly, certain aspects herein utilize an artificial intelligence (AI) based or machine learning (ML) based model for performing interference prediction at a UE. Interference prediction, as used herein, may refer to predicting any suitable value associated with interference, such as interference, noise, and/or the like. In particular, the model may be configured to take as input, parameters defining a future communications resource, such as parameters defining a timing (e.g., symbol index, slot index, etc.) of the communications resource, a frequency (e.g., subcarrier index, resource block (RB) index, etc.) of the communications resource, and/or a spatial property (e.g., spatial layer index) of the communications resource. The model may be configured to output a predicted interference for the future communications resource based on the input parameters. The model may be a supervised learning model trained on previous communications resources, each labeled with an actual interference measured for the communications resource. For example, the model could be trained to output a particular value, e.g., X dBm. However, since interference is a continuum of values, such a trained model may have large variance in prediction for small changes in input parameters, which may lead to inaccurate (e.g., noisy) predictions.

Accordingly, certain aspects herein utilize "soft interference prediction" instead of just predicting that the interference of a particular communications resource is a particular value e.g., X dBm, or within a particular range, e.g., X to Y dBm. For example, for performing soft interference prediction, a plurality of interference classes may be defined, each interference class being associated with a range of interference power. In one example, a first class may correspond to a range of −80 dBm to −78 dBm, and a second class may correspond to a range of −78 dBm to −76 dBm. In certain embodiments, soft interference prediction for a given communications resource, as described herein, includes estimating the probability for each interference class that interference in the first communications resource at the UE will be within that interference class. For example, a soft prediction could be that there is an 80% probability the interference in the first communications resource as experienced at the UE will be within the first class, and a 20% probability that the interference will be in the second class.

As compared to merely predicting a particular interference power for a given communications resource, soft interference prediction, as described herein, advantageously takes into account the order of different classes, thereby leading to better prediction. Accordingly, certain aspects relate to using a soft-encoding ground truth for training the supervised learning model. For example, for training the model, instead of labeling the input data for a communications resource with a particular interference value, or just labeling the input data as corresponding to one interference class, the input data for the communications resource may be labeled with a set of probabilities associated with the different interference classes. In particular, the probability associated with the interference class corresponding to the actual interference for the communications resource is set to the highest probability in the set. Further, the closer an interference class is to the interference class corresponding to the actual interference, the higher the probability value assigned to it. The model, based on such training, tends toward making more accurate predictions. Such accuracy in predictions can help the network entity and/or UE to better determine whether certain communications resources should be avoided for communications (e.g., transmission or reception) by the UE, such as due to high interference, thereby improving the likelihood data is communicated successfully. Further, such accuracy in predictions allows the UE to better cancel interference on a communications resource, as it can predict the time/frequency correlation of the interference that should be used for demodulation of signals received on the communications resource.

Further, as compared to merely predicting a particular interference power for a given communications resource, soft interference prediction, as described herein, advantageously allows for flexibility in use of the predicted values and/or reporting the prediction from the UE to the network entity. For example, the soft interference prediction values can be processed, at the UE or the network entity, to determine what sets of interference classes meet target precision requirements or target confidence requirements for prediction, as discussed further herein. In certain aspects, such processing may occur at the UE and the processed results can be sent to the network entity, which can save on network bandwidth as the amount of data reported may be less than reporting all of the raw prediction results. Such flexibility in the ability to process and report prediction values for communications resources allows for determination of which communications resources meet target metrics such as target precision or target confidence, and as such are viable for use by the UE.

Accordingly, certain aspects herein provide techniques for a network entity to configure parameters for soft interference prediction at a UE, such as parameters related to definitions of interference classes, metrics for processing the soft interference prediction values, indication of which communications resources to perform soft interference prediction, selection of a soft encoding function, configuration of model training parameters, etc. For example, the network entity may have information regarding locations of UEs or interference patterns in a cell where the UE is located, and configure the UE with parameters well suited for soft interference prediction in view of such UE location. Further, certain aspects herein provide techniques for a UE to report soft interference predictions, based on the configuration by the network entity.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device (e.g., a user equipment (UE), a base station (BS), a component of a BS, a server, etc.) and/or a communications function performed by a communications device. For example, various functions of a network as well as various devices associated with and interacting with a network may be considered network entities.

In the depicted example, wireless communications network 100 includes base stations (BSs) 102, user equipments (UEs) 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). ABS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
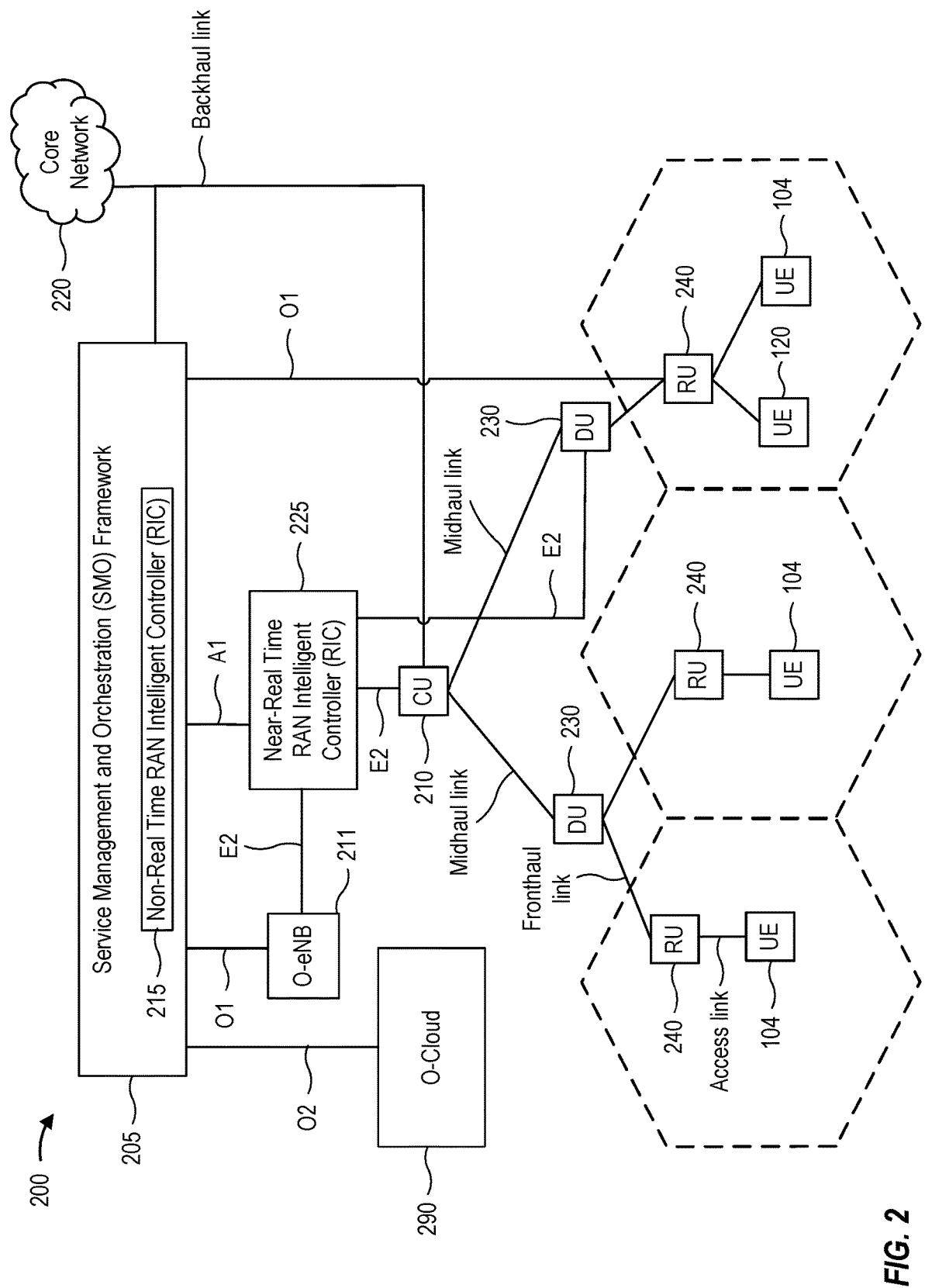
FIG. 2 depicts an example disaggregated base station architecture.

While BSs 102 are depicted in various aspects as unitary communications devices, BSs 102 may be implemented in various configurations. For example, one or more components of base station may be disaggregated, including a central unit (CU), one or more distributed units (DUs), one or more radio units (RUs), a radio unit (RU), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". BS 180 may also receive the beamformed signal from UE 104 in one or more receive directions 182'. Base station 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communications with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172 in the depicted example. MME 162 may be in communications with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and/or a User Plane Function (UPF) 195. AMF 192 may be in communications with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
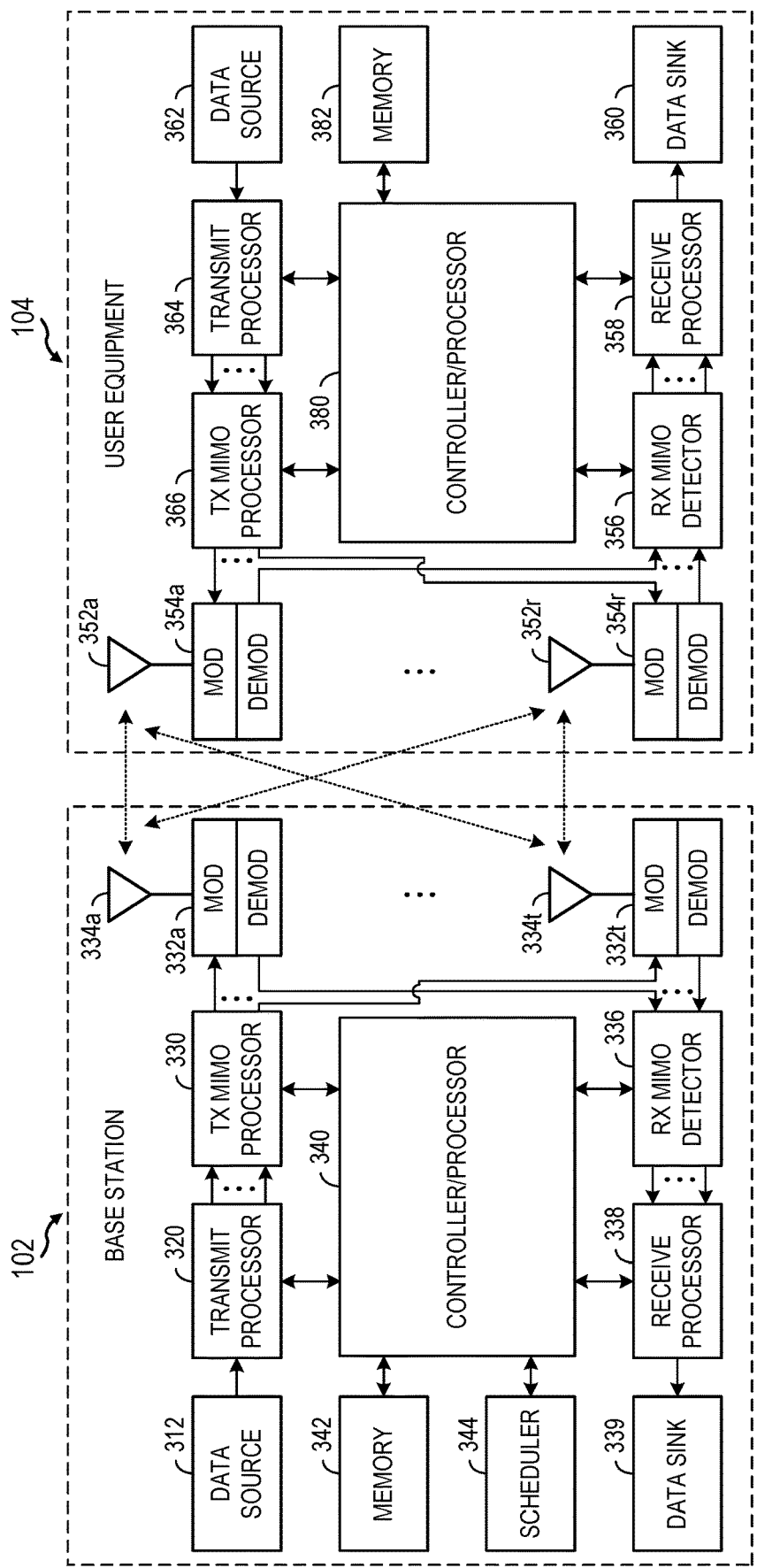
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334$a$-$t$ (collectively 334), transceivers 332$a$-$t$ (collectively 332), which include modulators and demodulators, and other aspects, which enable wireless transmission of data (e.g., retrieved from data source 312) and wireless reception of data (e.g., provided to data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352$a$-$r$ (collectively 352), transceivers 354$a$-$r$ (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
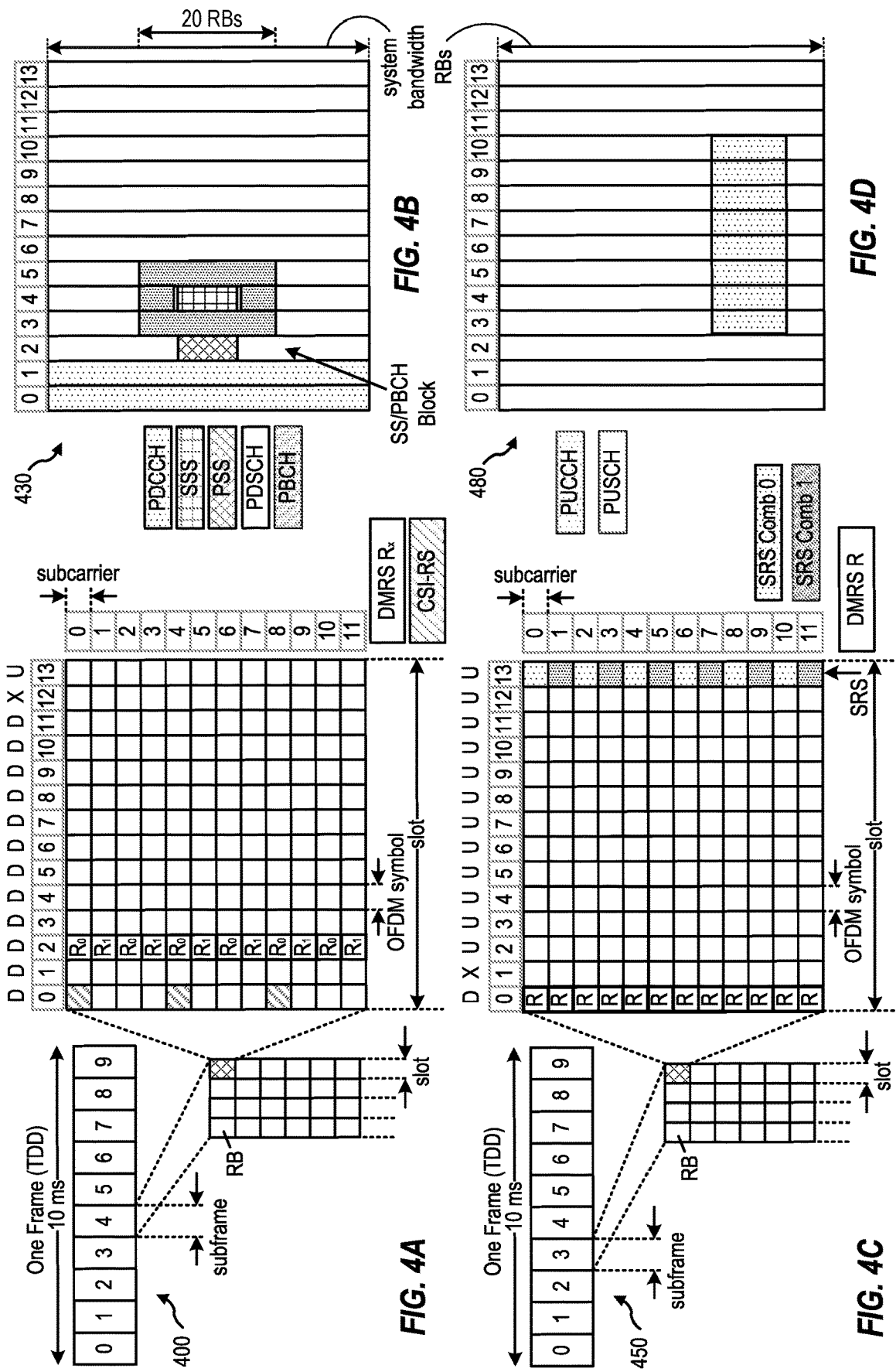
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and in the time domain with SC-FDM.

A wireless communications frame structure may be frequency division duplex (FDD), in which for a particular set of subcarriers and subframes within the set of subcarriers are dedicated for either DL or UL. Wireless communications frame structures may also be time division duplex (TDD), in which for a particular set of subcarriers and subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot configuration. Subframes may also include mini-slots, which generally have fewer symbols than an entire slot. Other wireless communications technologies may have a different frame structure and/or different channels.

In certain aspects, generally, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Soft Interference Prediction and Reporting

Example Neural Network for Soft Interference Prediction

Figure 5:
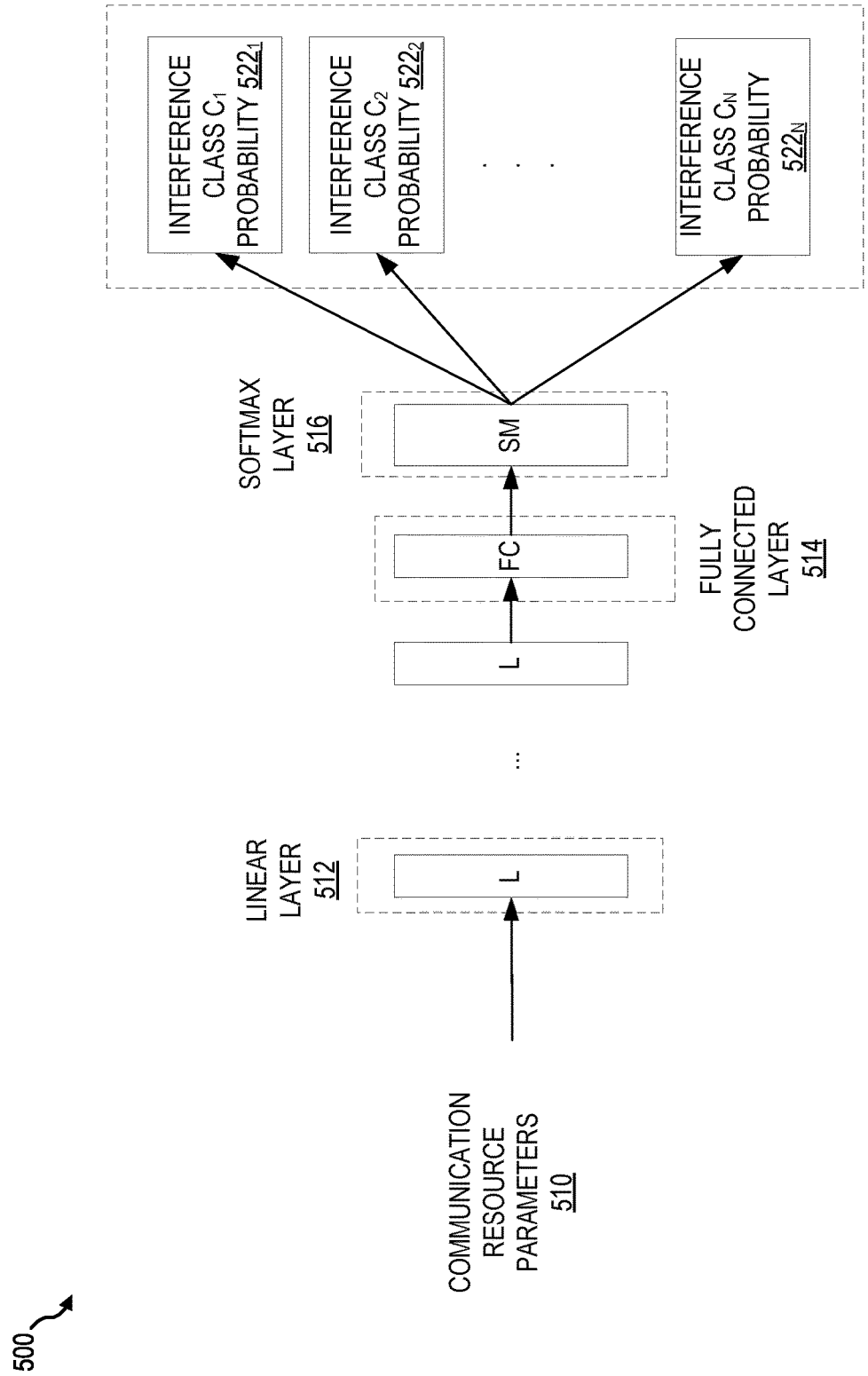
FIG. 5 depicts an example neural network for soft interference prediction.

FIG. 5 depicts an example neural network 500 for soft interference prediction. In certain aspects, the neural network 500 may be executed at UE 104.

As discussed, certain aspects herein relate to performing interference prediction for future communication resources, referring to communication resources that have not yet occurred in time. Certain aspects herein utilize an AI/ML based model for performing interference prediction. Neural network 500 is just one example of an AI/ML based model that can be used for performing interference prediction. However, it should be noted that other models could also be similarly used, using the same or similar inputs and outputs as discussed herein.

In certain aspects, as discussed, neural network 500 is configured to generate soft interference prediction instead of just predicting that the interference of a particular communication resource is a particular value. For example regression models that predict a single value for interference often produce noisy predictions without any confidence measure associated with each prediction. In contrast, certain aspects herein provide for soft interference prediction whereby UE 104 can estimate/predict, for a communication resource, the probability for each interference class of plurality of interference classes that interference in the communication resource at the UE 104 will be within that interference class. As discussed, an interference class may correspond to a range of interference power. For example, the UE 104 can predict a distribution (e.g., represented using a probability mass function or a probability density function) of interference power levels for a future communication resource. The distribution may correspond to a particular probability value associated with the different interference power levels. As used herein, a probability value may be, in certain aspects, an actual probability the interference power level occurs, such as in terms of percentage or a probability measure such as log likelihood, or, in certain aspects, a score related to or based on (e.g., a function of or correlated to) the probability associated with the interference power level. A probability mass function is a function that gives the probability that a discrete random variable is exactly equal to some value. A probability density function is a function whose value at any given sample (or point) in the sample space (the set of possible values taken by the random variable) can be interpreted as providing a relative likelihood that the value of the random variable would be close to that sample.

In certain aspects, neural network 500 may be trained during a training phase, as later discussed in further detail, such that during the inference phase, the neural network 500 predicts interference for future communication resources. For example, during the inference phase, the neural network 500 takes as input 510 one or more parameters defining a future communication resource. The one or more parameters defining the future communication resource may include a time parameter of the communication resource (e.g., a symbol index within a slot, a slot index within a frame, offset, etc.), such as a relative time within a recurring time period (e.g., a frame, subframe, slot, etc.). The one or more parameters defining the future communication resource may include a frequency parameter of the communication resource (e.g., a subcarrier index, a RB index, a RBG index, offset, frequency carrier value, etc.). The one or more parameters defining the future communication resource may include a spatial parameter of the communication resource (e.g., a spatial layer index, an antenna port, a beam direction, a beam angle, etc.). In some aspects, one or more parameters defining the future communication resource or other input 510 may include locally stored historical interference information based on measurements of communication resources locally at the UE. For example, locally stored historical interference information includes a measured interference power level for one or more past communication resources (e.g., a time, frequency or spatial resource or a combination of them), such as one or more past communication resources having similar characteristics (e.g., frequency and spatial parameters) as the communication resource for which interference is predicted. In some aspects, one or more parameters defining the future communication resource or other input 510 may include a time series of past measured interference power levels for multiple past communication resources.

Based on the input 510, the neural network 500 can output, for a future communication resource, a plurality of probability values $522_1$-$522_n$ for a plurality of interference classes $c_1$ to $c_n$. In particular, a plurality of non-overlapping interference classes $c_1$ to $c_n$ may be defined (e.g., pre-defined, configured at the UE 104 by network entity 102, etc.), each interference class associated with a different range of interference power levels. The neural network 500 determines a probability value that the interference power level for the future communication resource will be within the range of interference power levels for each of the defined interference classes. In some aspects, the neural network 500 can output, for a set of future communication resources, a matrix of probability values, where each row of the matrix can correspond to a particular future communication resource and each column can correspond to probability values for a particular interference class.

For example, in some aspects, interference classes can represent ranges of power levels quantized (e.g., divided) into intervals. In certain aspects, a start power level and an end power level can be specified such that only the most relevant power levels are more represented.

For example, a set of n interference classes can be defined to represent intervals shown as the following:

$$c_i = \begin{cases} (-\infty, s] & i = 1 \\ (s + (i-2)q, s + (i-1)q] & 2 \leq i \leq n-1 \\ (e, \infty) & i = n \end{cases}$$

where $c_i$ denotes the interference class (also referred to as interference class i), s the start power level, e the end power level and q the step-size. In certain aspects, the interference classes are ordered in terms of interference power levels, such as increasing or decreasing. Interference classes defined using the example method above are uniform and/or logarithmic. Other definitions to divide interference classes can be used to generate non-uniform levels or intervals (e.g., the step-size can increase by 1 dBm for the each of the following interference classes).

In one example, $c_1$ (interference class 1) corresponds to a range of −80 dBm or less (e.g., interval (−∞, −80 dBm]), $c_2$ (interference class 2) to a range of greater than −80 dBm to less than or equal to −78 dBm (e.g., interval (−80 dBm, −78 dBm]) and $c_N$ (interference class N) to a range of greater than −50 dBm (e.g., interval (−50 dBm, −∞)).

Continuing with the example, the output probability value $522_1$, as an example, corresponds to the probability that the interference experienced by UE 104 in the future communication resource will be within interference class $c_1$, meaning the probability the interference power level would fall within the interval (−μ, −80 dBm].

Training the neural network 500 can allow the neural network 500 to learn the correlations between previous communication resources. During the training phase, the neural network 500 takes as input communication resource parameters for a communication resource, along with label data comprising a plurality of probability values $522_1$-$522_n$ corresponding to the communication resource. The communication resource may have been a previous communication resource for which the UE 104 actually measured interference power level, such as by measuring a reference signal (RS) transmitted by the network entity 102 to the UE 104 in the communication resource. As is understood in supervised learning, the neural network 500 uses the input training data along with the label data to train the neural network 500 to approximately output (e.g., by optimizing a loss function) the plurality of probability values $522_1$-$522_n$ of the label data when receiving as input the communication resource parameters associated with the label data. Accordingly, once trained, for future communication resources similar to the communication resource, the neural network 500 may output similar probability values, as the expected interference for the future communication resource may be expected to be similar.

As the actual interference power level associated with a past communication resource used to train the neural network 500 may be known, as it is actually measured, the "correct" output (also known as the ground truth interference class label, or ground truth class) of the neural network 500 would be a 1 (i.e., 100%) probability value for the interference class $c_i$ within which the actual interference power level falls, and a 0 probability value for the remaining interference classes. For example, as shown in FIG. 6A, the label data 600a may include a 1 for one interference class 2, and zeroes for the remaining interference classes 1, 3, 4, 5, and 6. Such label data used for training may be referred to as "one-hot encoding."

In some examples, in a neural network, such as neural network 500, designed to solve classification problems, such as classifying the communication resource parameters with an associated interference class, a loss function, such as a cross entropy loss function, may be used during training. Cross entropy loss function penalizes errors in predictions equally. For example, given one-hot encoding label data 600a, predicting the interference power level falls in interference class 3, which is close to the correct interference class 2, is considered just as wrong as predicting interference class 6, which has a value further from the correct value for interference than interference class 3. Using one-hot encoding label data can cause a neural network to converge more slowly, and hence incur higher cost during training (e.g., longer time and more computational resources). In some examples, the loss functions used by the neural network 500 during training can be a L1 loss function, a L2 loss function and/or the like instead of a cross entropy loss function.

Accordingly, in certain aspects herein, instead of labeling training data using one-hot encoding, soft-encoding is used in the labels. In particular, in soft-encoding, the closer the interference class is to the actual interference class associated with the communication resource used as training data for the neural network 500, the higher the probability value is given to that interference class. For example, as shown in FIG. 6B, for the same communication resource input data as discussed with respect to label data 600a of FIG. 6A, the label data 600b may include a 0.5 for interference class 2 (i.e., the actual interference class of the measured interference), and decreasing probability values for interference classes the further away from interference class 2.

Accordingly, the soft encoding label data 600b allows the neural network 500 to account for the natural order of interference classes. For example, the interference class with the highest probability value one-hot encoding label data 600a (e.g., interference class 2) will remain as the interference class with the highest probability value in the soft encoding label data 600b). The trained neural network 500 then outputs a smoother distribution of probability values for interference classes for a future communication resource when making inferences.

Using soft encoding labels data 600b can also allow the neural network 500 to converge faster, saving time and computational resources during training. Using soft encoding label data 600b, the further the predicted class is from the ground truth class (e.g., the class with label 1 in one-hot encoding label data 600a), the higher the error.

In certain aspects, to convert from one-hot encoding label data 600a to soft encoding label data 600b, the following conversion function can be utilized:

$$I_{en_i} = \frac{e^{-\|I_t - I_i\|^2}}{\sum_{k=1}^{N} e^{-\|I_t - I_k\|^2}}$$

where $I_{en_i}$ is the soft encoding label for interference class i, $I_t$ is the index (e.g., position) of the actual interference class of the communication resource (e.g., 2 as interference class 2 has a label of 1 in label data 600a), $I_i$ is the index (e.g., position) of class i (e.g., 1 for interference class 1, 2 for interference class 2 and/or the like), and N is the total number of classes (e.g., 6 in the example above). The classes can be renumbered as long as the order of the classes is preserved (e.g., the classes can be interference classes 0-5 instead). In certain aspects, the conversion function is similar to a softmax function, as discussed further herein.

Other conversion functions may similarly be used in certain aspects. For example, a conversion function can be a discretized Gaussian distribution built around the ground truth class. The different conversion functions can control how fast the loss increases as the predicted interference goes further away from the ground truth label.

Returning to FIG. 5, in certain aspects, the neural network 500 can include one or more successive linear layers (also known as dense layers), such as linear layer 512. Linear layer 512 can include one or more output neurons. Linear layer 512 can learn the linear correlation between its output neurons and inputs to the neurons. In some aspects, linear layer 512 is one object or instance of standard implementations, such as PyTorch torch.nn.Linear, TensorFlow tf.keras.layers.Dense and/or the like.

In some aspects, linear layer 512 can include an activation function. An activation function can help introduce nonlinearity into the neural network 500. The activation function can be a function applied element-wise to the output of a layer. For instance, the activation function is a sigmoid function or a Rectified Linear Unit (ReLU) function, a leaky-ReLU function, a softplus function and/or the like.

In some aspects, during training, linear layer 512 can be followed by a dropout layer to prevent overfitting. Dropout means at each step during training, randomly setting input units (e.g., input neurons) to 0 with a dropout rate p, which is a probability of a neuron to be zeroed. Inputs not set to 0 are scaled up by 1/(1−p) such that the sum over all inputs is unchanged.

In certain aspects, the neural network 500 can include fully connected layer 514. Fully connected layer 514 can have one or more output neurons. Fully connected layer 514 can contain all connection weights between its output neurons and the inputs to the neurons. In other words, a change in an input affects all outputs in fully connected layer 514. Fully connected layer 514 does not utilize dropout during training. Fully connected layer 514 also does not apply any activation function on its outputs.

In certain aspects, the neural network 500 can include a softmax layer 516. Softmax layer 516 can apply a softmax function element-wise to the outputs of the previous layer, which is the fully connected layer 514. The softmax function can allow the softmax layer 516 to output a vector of probability values. In some examples, log softmax function can be used in place of the softmax function by the softmax layer 516. In such examples, the softmax layer 516 outputs a vector of log likelihoods as a type of vector of probability values. In general, the softmax layer 516 applies softmax function or its variants to output a vector of p probability values. The output vector of probability values from the softmax layer 516 is shown as the plurality of probability values $522_1$-$522_n$.

In some aspects, the neural network 500 can include additional layers, such as a recurrent layer. A recurrent layer is a neural network layer that has internal memory. The memory is updated whenever there is a new input. The output is computed using both the current input and the internal memory. As a result, a recurrent layer is capable of learning sequential relationship in the inputs. The recurrent layer can help smooth the outputs and reduce noise in predictions. A linear layer, such as linear layer 512, can be replaced by a recurrent layer. In some aspects, the neural network 500 includes a majority of recurrent layers such that the neural network 500 is recurrent neural network.

In some aspects, the neural network 500 can be a Bayesian neural network. Instead of constructing a distribution (e.g., a probability mass function) of quantized interference power levels, a Bayesian neural network can directly learn and output a distribution (e.g., a probability density distribution) of interference power levels for a particular communication resource.

Example Federated Learning Model for Soft Interference Prediction

In certain aspects, network entity 102 may work with a plurality of UEs 104 to train a global soft interference prediction model (e.g., neural network 500) based on local training of local soft interference prediction models running on the plurality of UEs 104.

Figure 7:
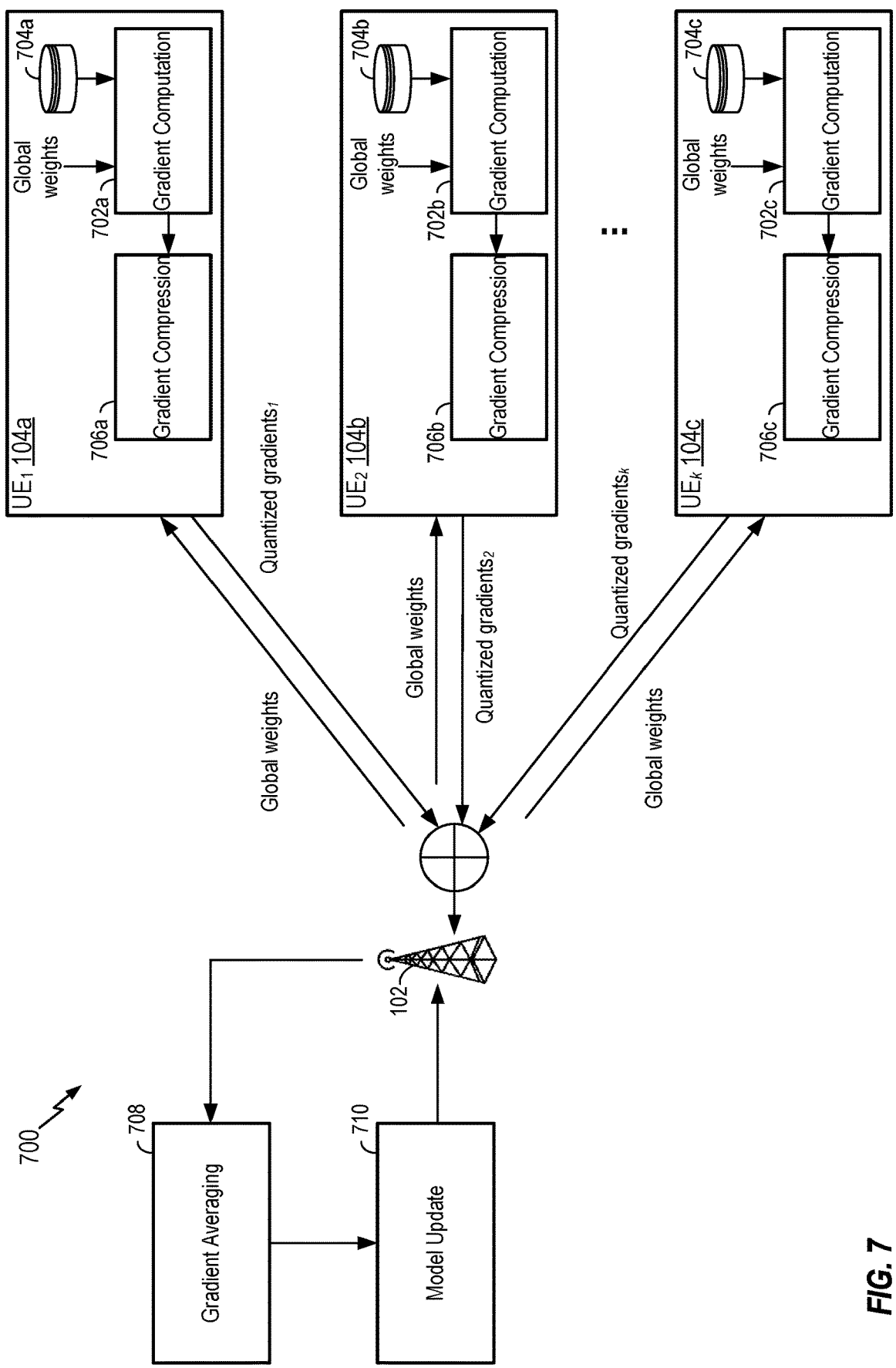
FIG. 7 illustrates an example of a federated learning architecture.

FIG. 7 illustrates an example of a federated learning architecture 700. In this example, the architecture 700 includes a network entity 102 (e.g., BS 102 of FIG. 1) and a plurality of UEs (e.g., UEs 104 of FIG. 1) including a first UE 104a, a second UE 104b, and a third UE 104c (collectively referred to as "UEs 104"). It should be noted that more or fewer UEs may be supported.

Initially, the network entity 102 may provide a statistical model (e.g., a "global model") that is shared between all of the devices) to the plurality of UEs 104. In some aspects, the global model used during the federated learning is the neural network 500. Once the model is constructed, the network entity 102 and UEs 104 may rely on an iterative process broken up into one or more UE-network entity interactions known as "learning rounds," (e.g., decentralized stochastic gradient descent (SGD) steps). Accordingly, the network entity 102 may transmit model updates (e.g., global weights of the updated global model) to each of the UEs 104 during one or more rounds. For example, in a first round, the network entity 102 may transmit initial parameters (e.g., global weights of the initial global model) of the model to the plurality of UEs. In some examples, global weights include parameters such as a dropout rate, a learning rate and/or the like.

For each round, each of the UEs 104 may receive the updated global weights and perform training of the local model of each of the UEs 104 using the updated global weights. The training may include a local gradient computation 702 (e.g., performed based on a local data set 704 and the model update). In some aspects, a local data set 704 is based on measurements of communication resources locally at the UE (e.g., locally stored historical interference information in input 510), and a local gradient computation 702 outputs the local gradient vectors during the backpropagation when training the local neural network. The local gradient computation 702 can be performed by a UE 104 in accordance with a local learning rate received from the network entity 102. In some examples, a local gradient compression 706 is performed by a UE to compress the calculated local gradient vectors. The result gradients from the local gradient compression 706 is a set of quantized gradients (e.g., quantized with respect to a specific bit-width).

Accordingly, each of the UEs 104 may train the local model according to the model update and calculate one or more gradient vectors locally at each UE. Each gradient vector is a potential update to the global model. The UEs 104 may then transmit their locally calculated gradient vectors, or quantized gradients (e.g., quantized gradients$_1$ from UE$_1$, quantized gradients$_2$ from UE$_2$, and/or quantized gradients$_k$ from UE$_k$), to the network entity 102.

Upon receiving the gradient vectors or quantized gradients from the UEs 104, the network entity 102 may determine a gradient average of the gradient vectors or of the quantized gradients by performing a gradient average calculation 708. In some aspects, the gradient average calculated during the gradient average calculation 708 is the mean value of the gradient vectors or the quantized gradients from the UEs 104. In some aspects, the gradient average calculated during the gradient average calculation 708 is a weighted average of the gradient vectors or the quantized gradients from the UEs 104. The weighting can be proportional to the impact of each UE 104 (e.g., the amount of data generated by a UE 104 and/or the frequency of communication between a UE 104 and the network entity 102).

The network entity 102 may then perform a model update 710 and generate updated global weights based on the gradient average, and transmit the updated global weights to the plurality of UEs 104. In some examples, the model update 710 can be performed by the network entity 102 in accordance with a server learning rate.

The foregoing steps may be repeated for each round until a global model requirement is met. In some examples, the global model requirement may include a minimum accuracy requirement (e.g., when an algorithm of the global model converges or a global loss function of the model is minimized).

Example Communication Flow for Soft Interference Prediction

As discussed, certain aspects herein provide techniques for network entity 102 to configure parameters for soft interference prediction at one or more UEs 104. For example, the network entity may have information regarding locations of UEs or interference patterns in a cell where the UE is located, and configure the UE with parameters well suited for soft interference prediction in view of such UE location. For example, UEs near the edge of a cell may be subject to higher interference than UEs near the center of a cell, and therefore the network entity 102 may configure these different UEs with different parameters for soft interference prediction. Further, in certain aspects, the network entity 102 has information regarding interference patterns, such as neighboring cell scheduling granularity, number of active UEs or transmission configuration indicator (TCI) states of a neighboring cell of the UE, number of active beams of a neighboring cell of the UE, loading in a neighboring cell, etc.

Further, certain aspects herein provide techniques for a UE to report soft interference predictions, based on the configuration by the network entity. In certain aspects, the network entity, based on the reported soft interference predictions, schedules the UE to use certain resources for communication (e.g., on an uplink, downlink, and/or sidelink). For example, the network entity may avoid scheduling the UE on communication resources predicted as having high interference. Further, the UE may use the predicted interference on a communication resource it is scheduled to communicate on, to better predict time/frequency correlation of the interference to be used in demodulating a received signal to better cancel the interference.

Figure 8:
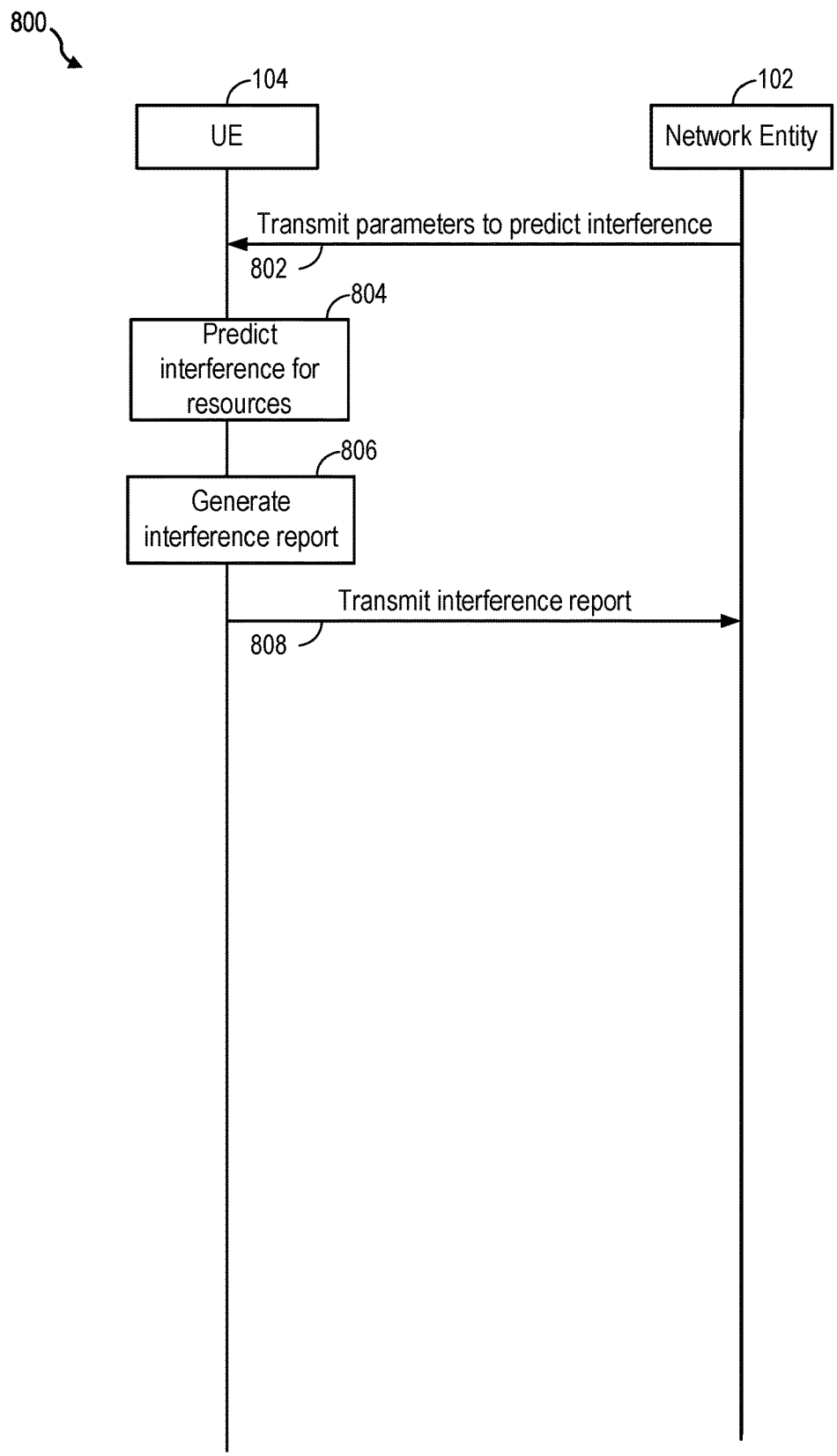
FIG. 8 is a call-flow diagram illustrating example communications between a network entity and a UE.

FIG. 8 is a call-flow diagram illustrating example communications 800 between a network entity 102 (e.g., BS 102 of FIG. 1) and a UE 104 (e.g., UE 104 of FIG. 1). Although FIG. 8 illustrates one UE, the techniques disclosed herein can support any suitable number of UEs.

In certain aspects, prior to communications 800, UE 104 may report to network entity 102 capability information indicating whether it can perform soft interference prediction. In certain aspects, communications 800 may only occur if UE 104 is capable of performing soft interference prediction.

In certain aspects, network entity 102 may define one or more parameters for a UE to perform soft interference prediction. Additionally or alternatively, in certain aspects, one or more parameters for a UE to perform soft interference prediction may be predefined. Example parameters may include the interference classes (e.g., actual values, index values, etc.) used for soft interference prediction (such as the interference classes discussed with respect to FIG. 5). Example parameters may include metrics to process soft interference prediction (e.g., a configuration to average certain soft interference predictions on specific communication resources, a configuration to use certain soft interference predictions for interference variance and auto-correlation function calculation in time, frequency, and/or space). Example parameters may include a configuration to process the soft interference predictions to meet a target criteria such as a target precision and/or a target confidence. An example of a target precision and/or a target confidence to meet is discussed in more detail below with respect to FIG. 9. Example parameters may include a soft encoding function (e.g., definition of the function, parameters of the function, index value selecting among a plurality of configured functions) to use for labelling input data during training of the soft inference prediction model, such as neural network 500. Example parameters may include a soft interference prediction model, such as neural network 500 (e.g., definition of the model, parameters of the model, index value selecting among a plurality of configured models). Example parameters may include configuration of communication resources for which the UE should perform soft interference prediction (e.g., index values of slots, symbols, RBs and/or RBGs, index values of Tx and/or Rx beams, etc.). Example parameters may include model training parameters for the soft interference prediction model (e.g., number of layers of the model, number of neurons per layer, learning rate, dropout rate, model weights, and/or other neural network parameters).

In some aspects, network entity 102 knows a location of a UE and interference patterns based on some external factors, such as neighboring cells' scheduling granularity, number of active UEs, TCI states, number of active beams, loading, and/or the like. In such aspects, the parameters for a UE to perform soft interference prediction can be adjusted accordingly by network entity 102 based on the UE location and interference patterns.

In certain aspects, network entity 102 may transmit to the UE 104 a request for additional information, such as an indication to report interference variance or auto-correlation (e.g., locally at a UE) in time, frequency, or space, an indication to report capability information about the capability of a UE to perform soft interference predictions, and/or the like.

In a first communication 802, the network entity 102 may transmit one or more parameters for a UE to perform soft interference prediction to UE 104 for the UE to predict soft interference. The parameters can be transmitted by the network entity 102 via a radio resource control (RRC) message, a medium access control (MAC) control element (CE), or a downlink control information (DCI).

In some examples, the soft interference prediction model and model training parameters are already stored locally to a UE 104 and do not need network entity 102 to transmit such information.

In response to receiving the parameters to perform the first process 804 to predict interference, UE 104 can construct or recover a local soft interference prediction model (e.g., neural network 500). UE 104 can predict, using the local soft interference prediction model, for at least one communication resource, a soft interference prediction as discussed herein. For example, the predicted interference may include a plurality of probability values, each probability value being associated with a different class associated with a corresponding range of interference power. For example, the soft interference prediction may include a distribution of probability values for the interference classes.

Figure 9:
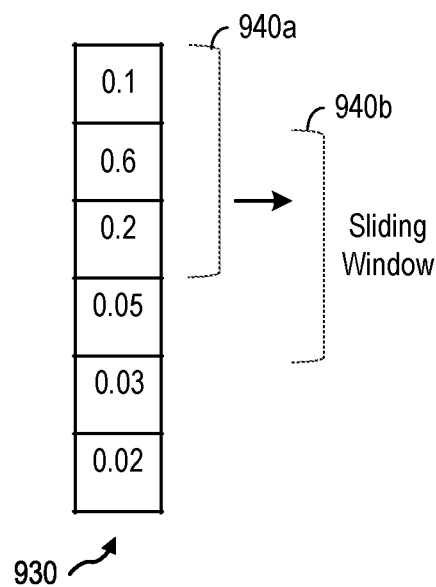
FIG. 9 depicts an example determination of a target criteria, such as a target precision requirement and/or a target confidence based on a soft interference prediction for a communication resource.

In certain aspects, UE 104 can process the predicted interference to meet a target precision and/or target confidence requirement (e.g., such as described with respect to FIG. 9).

After performing the first process 804 to predict interference, UE 104 can proceed to performing the second process 806 to generate an interference report. In certain aspects, the interference report includes the predicted interference for the at least one communication resource, such as the probability values for the interference classes, and in certain aspects, an identification of the at least one communication resource. In certain aspects, the report includes a distribution of the probability values for the interference classes (e.g., a probability density function or probability mass function). In certain aspects, the distribution of the probability values for the interference classes is the plurality of probability values $522_1$-$522_n$. In certain aspects, the report is a vector of predictions for one or more communication resources. In certain aspects, the vector includes an indication of one predicted interference class (e.g., the class with the highest probability value) for each communication resource. In certain aspects, the vector includes, along with the indication of the predicted interference class, a confidence value for the predicted class (e.g., the probability value associated with the predicted interference class). In certain aspects, the report includes the confidence value (e.g., probability value) for each interference class for each of the one or more communication resources. In certain aspects, the confidence value for an interference class, instead of an actual probability, may be a quantized confidence (e.g., low, medium and high confidence for each interference classes), wherein each quantized confidence corresponds to a different range of probabilities. For example, low confidence may be [0-25%), medium confidence may be [25-70%), and high confidence may be [70%-100%]. It should be noted the range of quantization may be different than the example given, and may be equal or unequal between difference confidences.

In certain aspects, such as if configured by network entity 102, UE 104 averages the soft interference power predictions on a plurality of communication resources, such as according to configurations from network entity 102. For example, UE 104 can predict soft interference power for a group of RBs and/or group of slots instead of a RB or a slot to obtain a more robust soft interference prediction. Accordingly, in certain aspects, the report includes the calculated average(s).

In certain aspects, the UE 104 calculates and include in the report the interference variance and auto-correlation (e.g., locally at UE 104) in time, frequency, and/or space on a plurality of communication resources, such as specified by the network entity 102, such as if the interference variance or auto-correlation in time, frequency, or space is requested by network entity 102.

After performing the second process 806 to generate an interference report, UE 104 can, in a second communication 808, transmit the interference report to network entity 102. In certain aspects, after receiving the interference report, network entity 102 can process soft interference predictions indicated in the interference report to help with future scheduling as discussed.

In some aspects, in response to receiving an interference report after the second communication 808, network entity 102 can configure the interference predictions to use in interference variance and auto-correlation function calculation in time, frequency and space. Interference variance and auto-correlation function can help reduce the impact of interference or noise during demodulation.

Example Target Criteria for Soft Interference Prediction

FIG. 9 depicts an example determination of a target criteria, such as a target precision requirement and/or a target confidence based on a soft interference prediction for a communication resource.

Vector 930 is an example of a soft interference prediction for a future communication resource. For example, vector 930 may correspond to the output probability values $522_1$-$522_n$ for a future communication resource of a UE shown in FIG. 5. Vector 930 includes different output probabilities for the 6 interference classes, namely interference classes 1-6. Each class can correspond to a range (e.g., an interval) of power levels, as described above with respect to FIG. 5.

For example, interference class 1 corresponds to the interval (−∞, −80 dBm]), interference class 2 to the interval (−80 dBm, −75 dBm]), interference class 3 to the interval (−75 dBm, −70 dBm]), interference class 4 to the interval (−70 dBm, −65 dBm]), interference class 5 to the interval (−65 dBm, −60 dBm]) and interference class 6 to the interval (−60 dBm, −∞). In the example, the start power level is −80 dBm, the end power level is −60 dBm, and the step-size is 5 dBm.

Continuing with the example, given the vector 930, interference experienced by the UE in the future communication resource is within interference class 1 with a probability of 0.1, within interference class 2 with a probability of 0.6, within interference class 3 with a probability of 0.2, within interference class 4 with a probability of 0.05, within interference class 5 with a probability of 0.03 and within interference class 6 with a probability of 0.02.

In certain aspects, a target precision can be defined with respect to a step-size q (e.g., 5 dBm), where q is a step size between power levels of consecutive interference classes. For example, a target precision is an integer multiple of the step-size q. For example, a target precision may be defined as n*q dBm, where n is any positive integer up to the number of interference classes. Using a target precision, UE 104 can calculate probability values for predicted interference for a different (e.g., less) precision than on a per interference class level, and instead increase accuracy/confidence of predicted interference. In particular, if the target precision is n*q (e.g., n=2, q=5, 10 dBm, the probability values of n (e.g., 2) consecutive interference classes may be summed, and the probability value of the sum reported. The probability value over the range of the n summed interference classes may be more accurate than each interference class probability value individually, but may be less precise as the range within which interference power level is predicted is for n*q instead of q. In certain aspects, the UE 104 can report predicted interference for the target precision, such as configured by network entity 102.

In certain aspects, to calculate the predicted interferences that meet the target precision, a sliding window with size n can be used. For example, for a target precision of 15 dBm (e.g., n=3, q=5), a sliding window with size 3 can be used to sum the probability values of 3 consecutive interference classes. The sliding window first starts with window position 940a, including interference classes 1-3. The sum of the probabilities of interference classes 1-3 is calculated to be 0.9. The sliding window next moves by one step size q, meaning one class, to window position 940b, including interference classes 2-4, and the sum of the probabilities of interference classes 2-4 is calculated to be 0.85. The sliding window may incrementally move one step size q, meaning one class, at a time, until the last window, which in this case includes interference classes 4-6. In certain aspects, all the summed predicted interferences (and/or an indication of the interference classes corresponding to the predicted interferences) that meet the target precision are reported by UE 104 to the network entity 102. In certain aspects, one or more of the summed predicted interferences (and/or an indication of the interference classes corresponding to the predicted interferences) that meet the target precision are reported, such as the highest summed predicted interference, or the x highest summed predicted interferences (e.g., where x is a positive integer).

In some aspects, to calculate the sum of probability values of n consecutive interference classes to meet the target precision, the following formula defining a sliding window is used:

$$\max_i \left( \sum_{k=0}^{n-1} P(c_{i+k}) \right) \forall\, i \in [1, N - n + 1]$$

where P(•) denotes the probability value associated with an interference class (e.g., $c_{i+k}$), q is the step size between power levels of consecutive interference classes, and N is the total number of interference classes.

In the example above, the sum of the probabilities of interference classes 1-3 is the highest and may be reported as the set of consecutive interference classes meeting the target precision.

In certain aspects, a target confidence is a target probability value threshold with respect to the probability values. For example, a target confidence of 95% means that the interference power level experienced by the UE in the future communication resource falls within an interval of interference power levels with a probability of at least 0.95. In certain aspects, there is a tradeoff between confidence and precision, where a higher confidence may lead to a lower precision of interference prediction.

In certain aspects, to determine which set(s) of interference classes meet a target confidence, sums of sets of consecutive interference classes are calculated. Each set may be defined as starting from a different one of the interference classes. Further, each set may include the least number of consecutive interference classes needed to meet the target confidence. For example, where the target confidence is 0.25, the first set would include interference classes 1 and 2, as the value of interference class 1 (i.e., 0.1) alone is not enough to meet the target confidence, but the sum of class 1 and consecutive class 2 is enough (i.e., 0.7). The second set would include interference class 2 as the value of interference class 2 alone (i.e., 0.6) is enough. The third set would include interference classes 3 and 4 (i.e., sum value of 0.25). Further, there would be no additional sets, as the remaining sets starting from interference classes 4, 5, or 6 cannot have a summed value greater than 0.25 (e.g., classes 4, 5, and 6 have a summed value of 0.1). In certain aspects, all of the set(s) of interference classes that meet the target confidence (and/or the summed probability value for the one or more set(s) of interference classes) may be reported by the UE 104 to network entity 102. In certain aspects, one or more of the set(s) of interference classes that meet the target confidence (and/or the summed probability value for the one or more set(s) of interference classes) may be reported by the UE 104 to network entity 102, such as the set with the highest summed predicted interference, the sets with the x highest summed predicted interferences (e.g., where x is a positive integer), the set with the least number of interference classes, and/or the sets with the x least number of interference classes.

In certain aspects, meeting a target precision requirement or a target confidence requirement helps consolidate interference classes to be reported to a network entity 102 by a UE 104, for example, during the second communication 808 shown in FIG. 8.

In some aspects, instead of requesting a UE 104 to meet a target precision and/or a target confidence requirement, network entity 102 can process the vector 930 directly to meet the target precision and/or target confidence requirement.

Example Operations of a User Equipment

Figure 10:
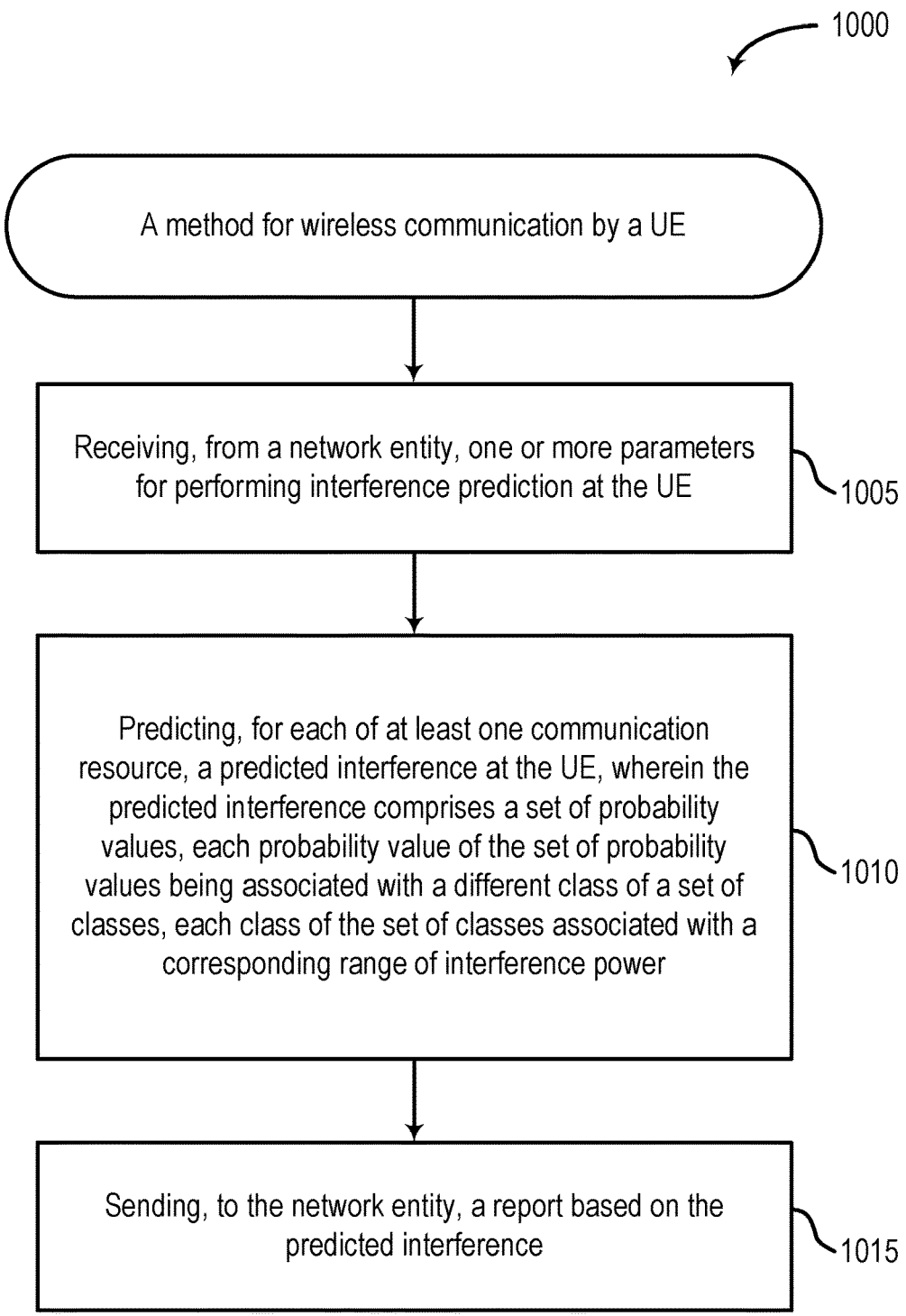
FIG. 10 depicts a method for wireless communications.

FIG. 10 shows a method 1000 for wireless communications by a UE, such as UE 104 of FIGS. 1 and 3.

Method 1000 begins at 1005 with receiving, from a network entity, one or more parameters for performing interference prediction at the UE. In some cases, the operations of this step refer to, or may be performed by, interference prediction circuitry as described with reference to FIG. 12.

Method 1000 then proceeds to step 1010 with predicting, for each of at least one communications resource, a predicted interference at the UE, wherein the predicted interference comprises a set of probability values, each probability value of the set of probability values being associated with a different class of a set of classes, each class of the set of classes associated with a corresponding range of interference power. In some cases, the operations of this step refer to, or may be performed by, interference prediction circuitry as described with reference to FIG. 12.

Method 1000 then proceeds to step 1015 with sending, to the network entity, a report based on the predicted interference. In some cases, the operations of this step refer to, or may be performed by, reporting circuitry as described with reference to FIG. 12.

Various aspects relate to the method 1000, including the following aspects.

In some aspects, the report comprises a probability density function or a probability mass function corresponding to the plurality of probability values. In some aspects, the report comprises an indication of one or more classes of the plurality of classes and one or more of the plurality of probability values associated with the one or more classes. In some aspects, the report comprises an indication of one or more classes of the plurality of classes and one or more quantized values of one or more of the plurality of probability values associated with the one or more classes.

In some aspects, the at least one communications resource comprises a plurality of communications resources, and wherein the report is based on one or more averaged probability values, each averaged probability value corresponding to an average of the probability values, for a given class of the plurality of classes, of the plurality of communications resources. In some aspects, the one or more parameters indicate the report should be based on the one or more averaged probability values.

In some aspects, the at least one communications resource comprises a plurality of communications resources, and wherein the report is based on one or more of an interference variance or auto-correlation in time, frequency, or space of the probability values, for at least one class of the plurality of classes, across the plurality of communications resources. In some aspects, the one or more parameters indicate the report should be based on the one or more of the interference variance or auto-correlation in time, frequency, or space.

In some aspects, method 1000 further includes transmitting, to the network entity, capability information indicating the UE is capable of performing interference prediction.

In some aspects, the one or more parameters indicate the plurality of classes. In some aspects, the one or more parameters indicate a target criteria, and wherein the report indicates one or more classes or one or more sets of consecutive classes that meet the target criteria.

In some aspects, the target criteria comprises a target precision, and wherein the report indicates, for each of the one or more sets of consecutive classes, a sum of the probability values of each class of the set, wherein a number of classes in each set is based on the target precision. In some aspects, the target criteria comprises a target probability value, and wherein the report indicates the one or more sets of consecutive classes that satisfy the target probability value, wherein a number of classes in each set is based on a sum of the probability values associated with the set satisfying the target probability value.

In some aspects, the one or more parameters comprise an encoding function or one or more model training parameters. In some aspects, the one or more parameters indicate the at least one communications resource. In some aspects, the one or more parameters are received in one of a RRC message, a MAC-CE, or a DCI.

Figure 12:
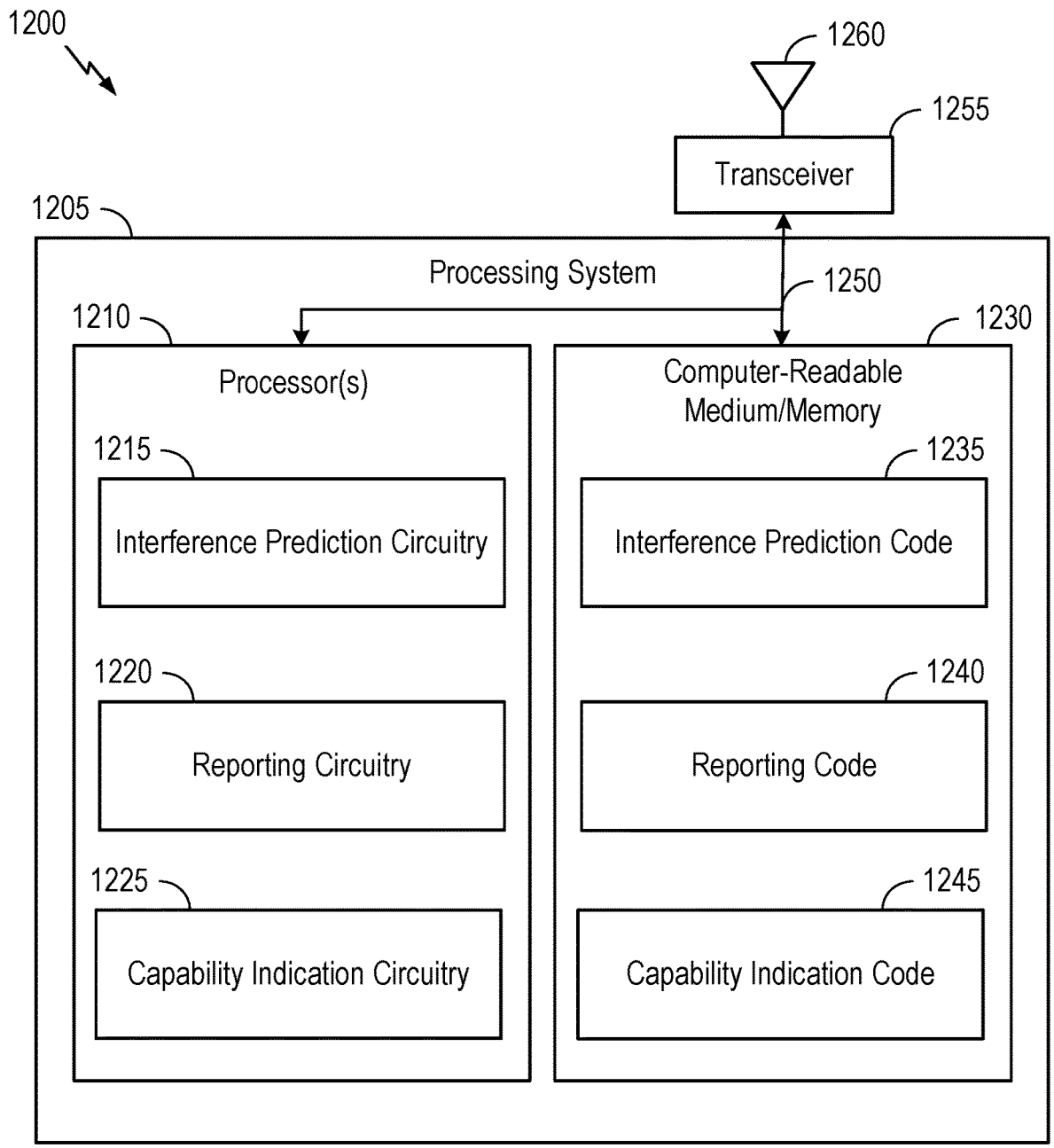
FIG. 12 depicts aspects of an example communications device.

In one aspect, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative steps are possible consistent with this disclosure.

Example Operations of a Network Entity

Figure 11:
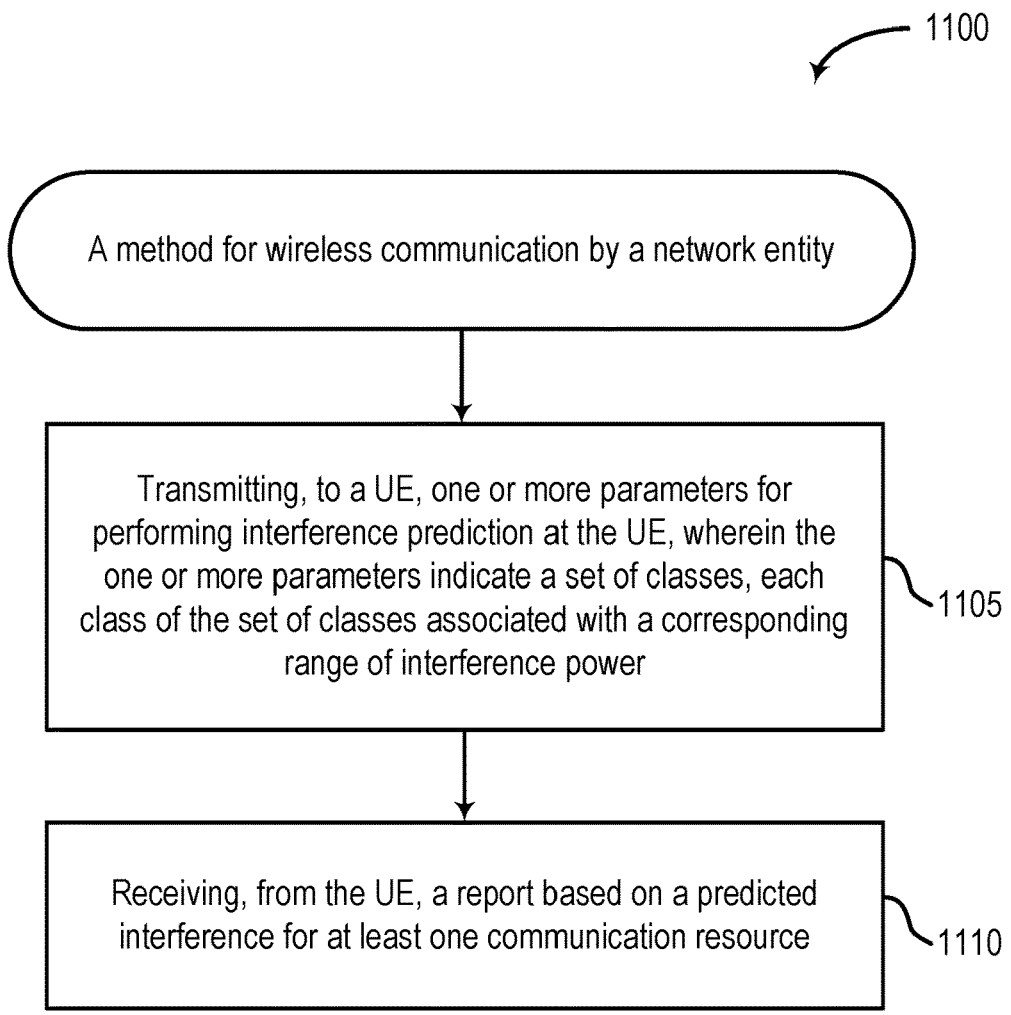
FIG. 11 depicts a method for wireless communications.

FIG. 11 shows a method 1100 for wireless communications by a network entity, such as BS 102 of FIGS. 1 and 3, or a disaggregated base station as discussed with respect to FIG. 2.

Method 1100 begins at 1105 with transmitting, to a UE, one or more parameters for performing interference prediction at the UE, wherein the one or more parameters indicate a set of classes, each class of the set of classes associated with a corresponding range of interference power. In some cases, the operations of this step refer to, or may be performed by, interference prediction configuration circuitry as described with reference to FIG. 13.

Method 1100 then proceeds to step 1110 with receiving, from the UE, a report based on a predicted interference for at least one communications resource. In some cases, the operations of this step refer to, or may be performed by, UE report processing circuitry as described with reference to FIG. 13.

Various aspects relate to the method 1100, including the following aspects.

In some aspects, the report comprises a probability density function or a probability mass function corresponding to a plurality of probability values, each probability value of the plurality of probability values being associated with a different class of the plurality of classes. In some aspects, the report comprises an indication of one or more classes of the plurality of classes and one or more probability values associated with the one or more classes. In some aspects, the report comprises an indication of one or more classes of the plurality of classes and one or more quantized values of one or more probability values associated with the one or more classes.

In some aspects, the at least one communications resource comprises a plurality of communications resources, and wherein the one or more parameters indicate the report should be based on one or more averaged probability values each averaged probability value corresponding to an average of probability values, for a given class of the plurality of classes, of the plurality of communications resources. In some aspects, the at least one communications resource comprises a plurality of communications resources, and wherein the one or more parameters indicate the report should be based on one or more of an interference variance or auto-correlation in time, frequency, or space of probability values, for at least one class of the plurality of classes, across the plurality of communications resources.

In some aspects, method 1100 further includes receiving, from the UE, capability information indicating the UE is capable of performing interference prediction.

In some aspects, the one or more parameters indicate a target criteria, and wherein the report indicates one or more classes or one or more sets of consecutive classes that meet the target criteria. In some aspects, the target criteria comprises a target precision, and wherein the report indicates, for each of the one or more sets of consecutive classes, a sum of probability values of each class of the set, wherein a number of classes in each set is based on the target precision. In some aspects, the target criteria comprises a target probability value, and wherein the report indicates the one or more sets of consecutive classes that satisfy the target probability value, wherein a number of classes in each set is based on a sum of probability values associated with the set satisfying the target probability value.

In some aspects, the one or more parameters comprise an encoding function or one or more model training parameters. In some aspects, the one or more parameters indicate the at least one communications resource.

Figure 13:
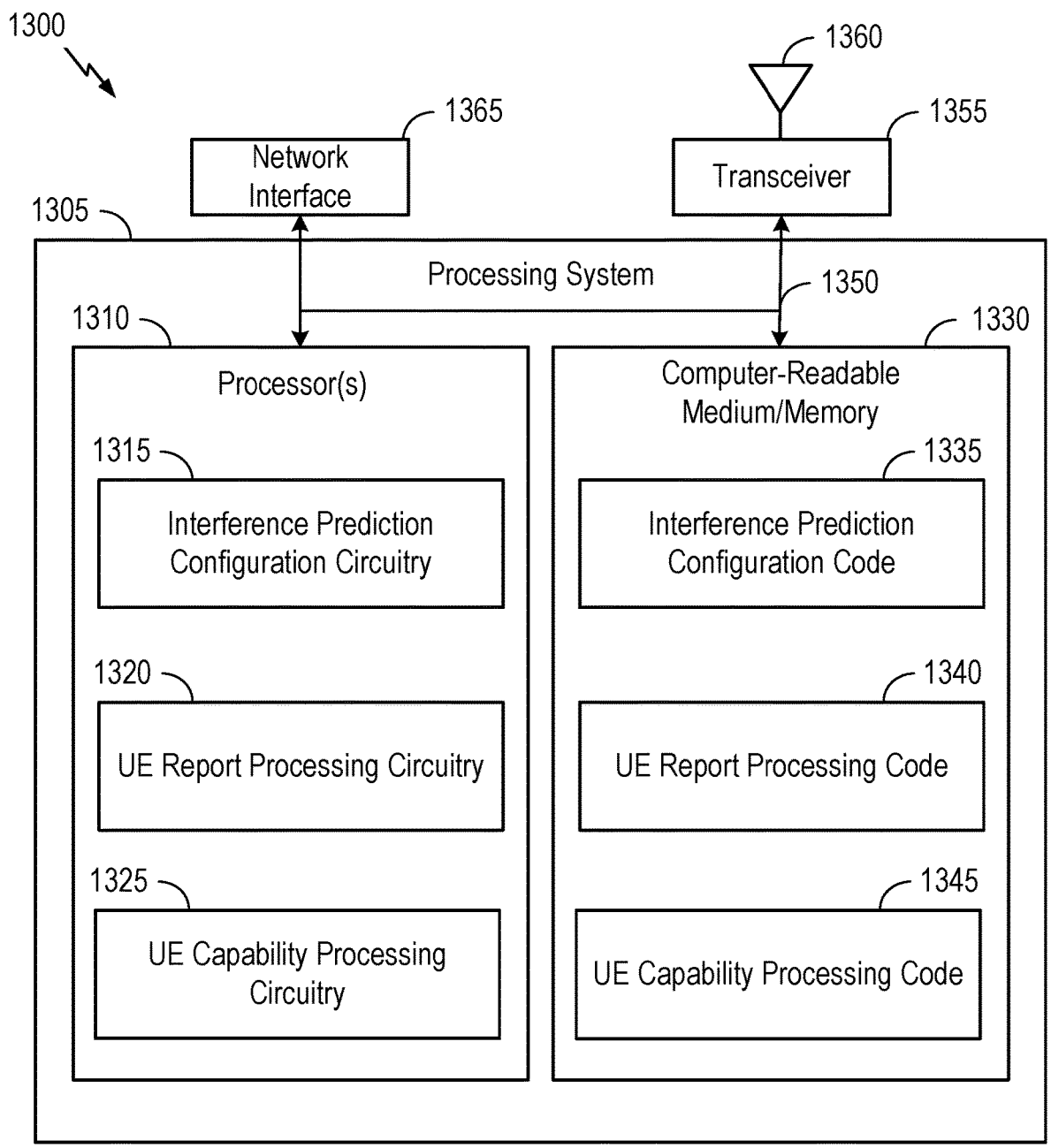
FIG. 13 depicts aspects of an example communications device.

In one aspect, method 1100, or any aspect related to it, may be performed by an apparatus, such as communications device 1300 of FIG. 13, which includes various components operable, configured, or adapted to perform the method 1100. Communications device 1300 is described below in further detail.

Note that FIG. 11 is just one example of a method, and other methods including fewer, additional, or alternative steps are possible consistent with this disclosure.

Example Communications Devices

FIG. 12 depicts aspects of an example communications device 1200. In some aspects, communications device 1200 is a user equipment, such as UE 104 described above with respect to FIGS. 1 and 3.

The communications device 1200 includes a processing system 1205 coupled to the transceiver 1255 (e.g., a transmitter and/or a receiver). The transceiver 1255 is configured to transmit and receive signals for the communications device 1200 via the antenna 1260, such as the various signals as described herein. The processing system 1205 may be configured to perform processing functions for the communications device 1200, including processing signals received and/or to be transmitted by the communications device 1200.

The processing system 1205 includes one or more processors 1210. In various aspects, the one or more processors 1210 may be representative of one or more of receive processor 358, transmit processor 364, TX MIMO processor 366, and/or controller/processor 380, as described with respect to FIG. 3. The one or more processors 1210 are coupled to a computer-readable medium/memory 1230 via a bus 1250. In certain aspects, the computer-readable medium/memory 1230 is configured to store instructions (e.g., computer-executable code) that when executed by the one or more processors 1210, cause the one or more processors 1210 to perform the method 1000 described with respect to FIG. 10, or any aspect related to it. Note that reference to a processor performing a function of communications device 1200 may include one or more processors 1210 performing that function of communications device 1200.

In the depicted example, computer-readable medium/memory 1230 stores code (e.g., executable instructions), such as interference prediction code 1235, reporting code 1240, and capability indication code 1245. Processing of the interference prediction code 1235, reporting code 1240, and capability indication code 1245 may cause the communications device 1200 to perform the method 1000 described with respect to FIG. 10, or any aspect related to it.

The one or more processors 1210 include circuitry configured to implement (e.g., execute) the code stored in the computer-readable medium/memory 1230, including circuitry such as interference prediction circuitry 1215, reporting circuitry 1220, and capability indication circuitry 1225. Processing with interference prediction circuitry 1215, reporting circuitry 1220, and capability indication circuitry 1225 may cause the communications device 1200 to perform the method 1000 described with respect to FIG. 10, or any aspect related to it.

Various components of the communications device 1200 may provide means for performing the method 1000 described with respect to FIG. 10, or any aspect related to it. For example, means for transmitting, sending or outputting for transmission may include transceivers 354 and/or antenna(s) 352 of the UE 104 illustrated in FIG. 3 and/or the transceiver 1255 and the antenna 1260 of the communications device 1200 in FIG. 12. Means for receiving or obtaining may include transceivers 354 and/or antenna(s) 352 of the UE 104 illustrated in FIG. 3 and/or the transceiver 1255 and the antenna 1260 of the communications device 1200 in FIG. 12.

According to some aspects, interference prediction circuitry 1215 receives, from a network entity, one or more parameters for performing interference prediction at the UE. In some examples, interference prediction circuitry 1215 predicts, for each of at least one communications resource, a predicted interference at the UE, wherein the predicted interference comprises a set of probability values, each probability value of the set of probability values being associated with a different class of a set of classes, each class of the set of classes associated with a corresponding range of interference power. According to some aspects, reporting circuitry 1220 sends, to the network entity, a report based on the predicted interference.

In some aspects, the report comprises a probability density function or a probability mass function corresponding to the set of probability values. In some aspects, the report comprises an indication of one or more classes of the set of classes and one or more of the set of probability values associated with the one or more classes. In some aspects, the report comprises an indication of one or more classes of the set of classes and one or more quantized values of one or more of the set of probability values associated with the one or more classes. In some aspects, the at least one communications resource comprises a set of communications resources, and wherein the report is based on one or more averaged probability values, each averaged probability value corresponding to an average of the probability values, for a given class of the set of classes, of the set of communications resources. In some aspects, the one or more parameters indicate the report should be based on the one or more averaged probability values. In some aspects, the at least one communications resource comprises a set of communications resources, and wherein the report is based on one or more of an interference variance or auto-correlation in time, frequency, or space of the probability values, for at least one class of the set of classes, across the set of communications resources. In some aspects, the one or more parameters indicate the report should be based on the one or more of the interference variance or auto-correlation in time, frequency, or space.

According to some aspects, capability indication circuitry 1225 transmits, to the network entity, capability information indicating the UE is capable of performing interference prediction. In some aspects, the one or more parameters indicate the set of classes. In some aspects, the one or more parameters indicate a target criteria, and wherein the report indicates one or more classes or one or more sets of consecutive classes that meet the target criteria. In some aspects, the target criteria comprises a target precision, and wherein the report indicates, for each of the one or more sets of consecutive classes, a sum of the probability values of each class of the set, wherein a number of classes in each set is based on the target precision. In some aspects, the target criteria comprises a target probability value, and wherein the report indicates the one or more sets of consecutive classes that satisfy the target probability value, wherein a number of classes in each set is based on a sum of the probability values associated with the set satisfying the target probability value. In some aspects, the one or more parameters comprise an encoding function or one or more model training parameters. In some aspects, the one or more parameters indicate the at least one communications resource. In some aspects, the one or more parameters are received in one of a RRC message, a MAC-CE, or a DCI.

FIG. 13 depicts aspects of an example communications device 1300. In some aspects, communications device 1300 is a network entity, such as BS 102 described above with respect to FIGS. 1 and 3.

The communications device 1300 includes a processing system 1305 coupled to the transceiver 1355 (e.g., a transmitter and/or a receiver) and/or a network interface 1365. The transceiver 1355 is configured to transmit and receive signals for the communications device 1300 via the antenna 1360, such as the various signals as described herein. The network interface 1365 is configured to obtain and send signals for the communications device 1300 via communications link(s), such as a backhaul link, midhaul link, and/or fronthaul link as described herein, such as with respect to FIG. 2. The processing system 1305 may be configured to perform processing functions for the communications device 1300, including processing signals received and/or to be transmitted by the communications device 1300.

The processing system 1305 includes one or more processors 1310. In various aspects, one or more processors 1310 may be representative of one or more of receive processor 338, transmit processor 320, TX MIMO processor 330, and/or controller/processor 340, as described with respect to FIG. 3. The one or more processors 1310 are coupled to a computer-readable medium/memory 1330 via a bus 1350. In certain aspects, the computer-readable medium/memory 1330 is configured to store instructions (e.g., computer-executable code) that when executed by the one or more processors 1310, cause the one or more processors 1310 to perform the method 1100 described with respect to FIG. 11, or any aspect related to it. Note that reference to a processor of communications device 1300 performing a function may include one or more processors 1310 of communications device 1300 performing that function.

In the depicted example, the computer-readable medium/memory 1330 stores code (e.g., executable instructions), such as interference prediction configuration code 1335, UE report processing code 1340, and UE capability processing code 1345. Processing of the interference prediction configuration code 1335, UE report processing code 1340, and UE capability processing code 1345 may cause the communications device 1300 to perform the method 1100 described with respect to FIG. 11, or any aspect related to it.

The one or more processors 1310 include circuitry configured to implement (e.g., execute) the code stored in the computer-readable medium/memory 1330, including circuitry such as interference prediction configuration circuitry 1315, UE report processing circuitry 1320, and UE capability processing circuitry 1325. Processing with interference prediction configuration circuitry 1315, UE report processing circuitry 1320, and UE capability processing circuitry 1325 may cause the communications device 1300 to perform the method 1100 as described with respect to FIG. 11, or any aspect related to it.

Various components of the communications device 1300 may provide means for performing the method 1100 as described with respect to FIG. 11, or any aspect related to it. Means for transmitting, sending or outputting for transmission may include transceivers 332 and/or antenna(s) 334 of the BS 102 illustrated in FIG. 3 and/or the transceiver 1355 and the antenna 1360 of the communications device 1300 in FIG. 13. Means for receiving or obtaining may include transceivers 332 and/or antenna(s) 334 of the BS 102 illustrated in FIG. 3 and/or the transceiver 1355 and the antenna 1360 of the communications device 1300 in FIG. 13.

According to some aspects, interference prediction configuration circuitry 1315 transmits, to a UE, one or more parameters for performing interference prediction at the UE, wherein the one or more parameters indicate a set of classes, each class of the set of classes associated with a corresponding range of interference power. According to some aspects, UE report processing circuitry 1320 receives, from the UE, a report based on a predicted interference for at least one communications resource.

In some aspects, the report comprises a probability density function or a probability mass function corresponding to a set of probability values, each probability value of the set of probability values being associated with a different class of the set of classes. In some aspects, the report comprises an indication of one or more classes of the set of classes and one or more probability values associated with the one or more classes. In some aspects, the report comprises an indication of one or more classes of the set of classes and one or more quantized values of one or more probability values associated with the one or more classes. In some aspects, the at least one communications resource comprises a set of communications resources, and wherein the one or more parameters indicate the report should be based on one or more averaged probability values each averaged probability value corresponding to an average of probability values, for a given class of the set of classes, of the set of communications resources. In some aspects, the at least one communications resource comprises a set of communications resources, and wherein the one or more parameters indicate the report should be based on one or more of an interference variance or auto-correlation in time, frequency, or space of probability values, for at least one class of the set of classes, across the set of communications resources.

According to some aspects, UE capability processing circuitry 1325 receives, from the UE, capability information indicating the UE is capable of performing interference prediction. In some aspects, the one or more parameters indicate a target criteria, and wherein the report indicates one or more classes or one or more sets of consecutive classes that meet the target criteria. In some aspects, the target criteria comprises a target precision, and wherein the report indicates, for each of the one or more sets of consecutive classes, a sum of probability values of each class of the set, wherein a number of classes in each set is based on the target precision. In some aspects, the target criteria comprises a target probability value, and wherein the report indicates the one or more sets of consecutive classes that satisfy the target probability value, wherein a number of classes in each set is based on a sum of probability values associated with the set satisfying the target probability value. In some aspects, the one or more parameters comprise an encoding function or one or more model training parameters. In some aspects, the one or more parameters indicate the at least one communications resource.

EXAMPLE CLAUSES

Implementation examples are described in the following numbered clauses:

Clause 1: A method for wireless communications by a UE, comprising: receiving, from a network entity, one or more parameters for performing interference prediction at the UE; predicting, for each of at least one communications resource, a predicted interference at the UE, wherein the predicted interference comprises a plurality of probability values, each probability value of the plurality of probability values being associated with a different class of a plurality of classes, each class of the plurality of classes associated with a corresponding range of interference power; and sending, to the network entity, a report based on the predicted interference.

Clause 2: The method of Clause 1, wherein the report comprises a probability density function or a probability mass function corresponding to the plurality of probability values.

Clause 3: The method of any one of Clauses 1 and 2, wherein the report comprises an indication of one or more classes of the plurality of classes and one or more of the plurality of probability values associated with the one or more classes.

Clause 4: The method of any one of Clauses 1-3, wherein the report comprises an indication of one or more classes of the plurality of classes and one or more quantized values of one or more of the plurality of probability values associated with the one or more classes.

Clause 5: The method of any one of Clauses 1-4, wherein the at least one communications resource comprises a plurality of communications resources, and wherein the report is based on one or more averaged probability values, each averaged probability value corresponding to an average of the probability values, for a given class of the plurality of classes, of the plurality of communications resources.

Clause 6: The method of Clause 5, wherein the one or more parameters indicate the report should be based on the one or more averaged probability values.

Clause 7: The method of any one of Clauses 1-6, wherein the at least one communications resource comprises a plurality of communications resources, and wherein the report is based on one or more of an interference variance or auto-correlation in time, frequency, or space of the probability values, for at least one class of the plurality of classes, across the plurality of communications resources.

Clause 8: The method of Clause 7, wherein the one or more parameters indicate the report should be based on the one or more of the interference variance or auto-correlation in time, frequency, or space.

Clause 9: The method of any one of Clauses 1-8, further comprising: transmitting, to the network entity, capability information indicating the UE is capable of performing interference prediction.

Clause 10: The method of any one of Clauses 1-9, wherein the one or more parameters indicate the plurality of classes.

Clause 11: The method of any one of Clauses 1-10, wherein the one or more parameters indicate a target criteria, and wherein the report indicates one or more classes or one or more sets of consecutive classes that meet the target criteria.

Clause 12: The method of Clause 11, wherein the target criteria comprises a target precision, and wherein the report indicates, for each of the one or more sets of consecutive classes, a sum of the probability values of each class of the set, wherein a number of classes in each set is based on the target precision.

Clause 13: The method of Clause 11, wherein the target criteria comprises a target probability value, and wherein the report indicates the one or more sets of consecutive classes that satisfy the target probability value, wherein a number of classes in each set is based on a sum of the probability values associated with the set satisfying the target probability value.

Clause 14: The method of any one of Clauses 1-13, wherein the one or more parameters comprise an encoding function or one or more model training parameters.

Clause 15: The method of any one of Clauses 1-14, wherein the one or more parameters indicate the at least one communications resource.

Clause 16: The method of any one of Clauses 1-15, wherein the one or more parameters are received in one of a RRC message, a MAC-CE, or a DCI.

Clause 17: A method for wireless communications by a network entity, comprising: transmitting, to a UE, one or more parameters for performing interference prediction at the UE, wherein the one or more parameters indicate a plurality of classes, each class of the plurality of classes associated with a corresponding range of interference power and receiving, from the UE, a report based on a predicted interference for at least one communications resource.

Clause 18: The method of Clause 17, wherein the report comprises a probability density function or a probability mass function corresponding to a plurality of probability values, each probability value of the plurality of probability values being associated with a different class of the plurality of classes.

Clause 19: The method of any one of Clauses 17 and 18, wherein the report comprises an indication of one or more classes of the plurality of classes and one or more probability values associated with the one or more classes.

Clause 20: The method of any one of Clauses 17-19, wherein the report comprises an indication of one or more classes of the plurality of classes and one or more quantized values of one or more probability values associated with the one or more classes.

Clause 21: The method of any one of Clauses 17-20, wherein the at least one communications resource comprises a plurality of communications resources, and wherein the one or more parameters indicate the report should be based on one or more averaged probability values each averaged probability value corresponding to an average of probability values, for a given class of the plurality of classes, of the plurality of communications resources.

Clause 22: The method of any one of Clauses 17-21, wherein the at least one communications resource comprises a plurality of communications resources, and wherein the one or more parameters indicate the report should be based on one or more of an interference variance or auto-correlation in time, frequency, or space of probability values, for at least one class of the plurality of classes, across the plurality of communications resources.

Clause 23: The method of any one of Clauses 17-22, further comprising: receiving, from the UE, capability information indicating the UE is capable of performing interference prediction.

Clause 24: The method of any one of Clauses 17-23, wherein the one or more parameters indicate a target criteria, and wherein the report indicates one or more classes or one or more sets of consecutive classes that meet the target criteria.

Clause 25: The method of Clause 24, wherein the target criteria comprises a target precision, and wherein the report indicates, for each of the one or more sets of consecutive classes, a sum of probability values of each class of the set, wherein a number of classes in each set is based on the target precision.

Clause 26: The method of Clause 24, wherein the target criteria comprises a target probability value, and wherein the report indicates the one or more sets of consecutive classes that satisfy the target probability value, wherein a number of classes in each set is based on a sum of probability values associated with the set satisfying the target probability value.

Clause 27: The method of any one of Clauses 17-26, wherein the one or more parameters comprise an encoding function or one or more model training parameters.

Clause 28: The method of any one of Clauses 17-27, wherein the one or more parameters indicate the at least one communications resource.

Clause 29: The method of any one of Clauses 17-28, wherein performing interference prediction comprises performing interference prediction alone or performing interference plus noise prediction, and wherein the predicted interference comprises a predicted interference alone or a predicted interference plus noise.

Clause 30: The method of any one of Clauses 1-16, wherein performing interference prediction comprises performing interference prediction alone or performing interference plus noise prediction, and wherein the predicted interference comprises a predicted interference alone or a predicted interference plus noise.

Clause 31: A processing system, comprising: a memory comprising computer-executable instructions; one or more processors configured to execute the computer-executable instructions and cause the processing system to perform a method in accordance with any one of Clauses 1-30.

Clause 32: A processing system, comprising means for performing a method in accordance with any one of Clauses 1-30.

Clause 33: A non-transitory computer-readable medium comprising computer-executable instructions that, when executed by one or more processors of a processing system, cause the processing system to perform a method in accordance with any one of Clauses 1-30.

Clause 34: A computer program product embodied on a computer-readable storage medium comprising code for performing a method in accordance with any one of Clauses 1-30.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), comprising:
receiving, from a network entity, one or more parameters for performing interference prediction at the UE;
predicting, for each of at least one communications resource, a predicted interference at the UE, wherein the predicted interference comprises a plurality of probability values, each probability value of the plurality of probability values being associated with a different class of a plurality of classes, each class of the plurality of classes associated with a corresponding range of interference power; and
sending, to the network entity, a report based on the predicted interference,
wherein the one or more parameters indicate a target criteria,
wherein the report indicates one or more classes or one or more sets of consecutive classes that meet the target criteria, and
wherein:
(a) the target criteria comprises a target precision; the report indicates, for each of the one or more sets of consecutive classes, a sum of the probability values of each class of the set; and a number of classes in each set is based on the target precision; or
(b) the target criteria comprises a target probability value; the report indicates the one or more sets of consecutive classes that satisfy the target probability value; and the number of classes in each set is based on a sum of the probability values associated with the set satisfying the target probability value.

2. The method of claim 1, wherein the report comprises a probability density function or a probability mass function corresponding to the plurality of probability values.

3. The method of claim 1, wherein the report comprises an indication of one or more classes of the plurality of classes and one or more of the plurality of probability values associated with the one or more classes.

4. The method of claim 1, wherein the report comprises an indication of one or more classes of the plurality of classes and one or more quantized values of one or more of the plurality of probability values associated with the one or more classes.

5. The method of claim 1, wherein the at least one communications resource comprises a plurality of communications resources, and wherein the report is based on one or more averaged probability values, each averaged probability value corresponding to an average of the probability values, for a given class of the plurality of classes, of the plurality of communications resources.

6. The method of claim 1, wherein the at least one communications resource comprises a plurality of communications resources, and wherein the report is based on one or more of an interference variance or auto-correlation in time, frequency, or space of the probability values, for at least one class of the plurality of classes, across the plurality of communications resources.

7. The method of claim 1, wherein the one or more parameters indicate the plurality of classes.

8. The method of claim 1, wherein the target criteria comprises the target precision, wherein the report indicates, for each of the one or more sets of consecutive classes, the sum of the probability values of each class of the set, wherein the number of classes in each set is based on the target precision.

9. The method of claim 1, wherein the target criteria comprises the target probability value, wherein the report indicates the one or more sets of consecutive classes that satisfy the target probability value, and wherein the number of classes in each set is based on the sum of the probability values associated with the set satisfying the target probability value.

10. The method of claim 1, wherein the one or more parameters comprise an encoding function or one or more model training parameters.

11. The method of claim 1, wherein the one or more parameters indicate the at least one communications resource.

12. A method for wireless communications by a network entity, comprising:
transmitting, to a user equipment (UE), one or more parameters for performing interference prediction at the UE, wherein the one or more parameters indicate a plurality of classes, each class of the plurality of classes associated with a corresponding range of interference power; and
receiving, from the UE, a report based on a predicted interference for at least one communications resource,
wherein the one or more parameters indicate a target criteria,
wherein the report indicates one or more classes or one or more sets of consecutive classes that meet the target criteria, and
wherein:
(a) the target criteria comprises a target precision; the report indicates, for each of the one or more sets of consecutive classes, a sum of probability values of each class of the set; and a number of classes in each set is based on the target precision; or
(b) the target criteria comprises a target probability value; the report indicates the one or more sets of consecutive classes that satisfy the target probability value; and the number of classes in each set is based on a sum of probability values associated with the set satisfying the target probability value.

13. The method of claim 12, wherein the target criteria comprises the target precision, wherein the report indicates, for each of the one or more sets of consecutive classes, the sum of probability values of each class of the set, and wherein the number of classes in each set is based on the target precision.

14. The method of claim 12, wherein the target criteria comprises the target probability value, wherein the report indicates the one or more sets of consecutive classes that satisfy the target probability value, and wherein the number of classes in each set is based on the sum of probability values associated with the set satisfying the target probability value.

15. A user equipment (UE) configured for wireless communications, comprising: a memory comprising computer-executable instructions; and a processor configured to execute the computer-executable instructions and cause the UE to:
receive, from a network entity, one or more parameters for performing interference prediction at the UE;
predict, for each of at least one communications resource, a predicted interference at the UE, wherein the predicted interference comprises a plurality of probability values, each probability value of the plurality of probability values being associated with a different class of a plurality of classes, each class of the plurality of classes associated with a corresponding range of interference power; and
send, to the network entity, a report based on the predicted interference,
wherein the one or more parameters indicate a target criteria,
wherein the report indicates one or more classes or one or more sets of consecutive classes that meet the target criteria, and
wherein:
(a) the target criteria comprises a target precision; the report indicates, for each of the one or more sets of consecutive classes, a sum of the probability values of each class of the set; and a number of classes in each set is based on the target precision; or
(b) the target criteria comprises a target probability value; the report indicates the one or more sets of consecutive classes that satisfy the target probability value; and the number of classes in each set is based on a sum of the probability values associated with the set satisfying the target probability value.

16. The UE of claim 15, wherein the report comprises a probability density function or a probability mass function corresponding to the plurality of probability values.

17. The UE of claim 15, wherein the report comprises an indication of one or more classes of the plurality of classes and one or more of the plurality of probability values associated with the one or more classes.

18. The UE of claim 15, wherein the report comprises an indication of one or more classes of the plurality of classes and one or more quantized values of one or more of the plurality of probability values associated with the one or more classes.

19. The UE of claim 15, wherein the at least one communications resource comprises a plurality of communications resources, and wherein the report is based on one or more averaged probability values, each averaged probability value corresponding to an average of the probability values, for a given class of the plurality of classes, of the plurality of communications resources.

20. The UE of claim 15, wherein the at least one communications resource comprises a plurality of communications resources, and wherein the report is based on one or more of an interference variance or auto-correlation in time, frequency, or space of the probability values, for at least one class of the plurality of classes, across the plurality of communications resources.

21. The UE of claim 15, wherein the one or more parameters indicate the plurality of classes.

22. The UE of claim 15, wherein the target criteria comprises the target precision, wherein the report indicates, for each of the one or more sets of consecutive classes, the sum of the probability values of each class of the set, wherein the number of classes in each set is based on the target precision.

23. The UE of claim 15, wherein the target criteria comprises the target probability value, wherein the report indicates the one or more sets of consecutive classes that satisfy the target probability value, and wherein the number of classes in each set is based on the sum of the probability values associated with the set satisfying the target probability value.

24. The UE of claim 15, wherein the one or more parameters comprise an encoding function or one or more model training parameters.

25. The UE of claim 15, wherein the one or more parameters indicate the at least one communications resource.

26. A network entity configured for wireless communications, comprising: a memory comprising computer-executable instructions; and a processor configured to execute the computer-executable instructions and cause the network entity to:
transmit, to a user equipment (UE), one or more parameters for performing interference prediction at the UE, wherein the one or more parameters indicate a plurality of classes, each class of the plurality of classes associated with a corresponding range of interference power; and
receive, from the UE, a report based on a predicted interference for at least one communications resource,
wherein the one or more parameters indicate a target criteria,
wherein the report indicates one or more classes or one or more sets of consecutive classes that meet the target criteria, and
wherein:
(a) the target criteria comprises a target precision; the report indicates, for each of the one or more sets of consecutive classes, a sum of probability values of each class of the set; and a number of classes in each set is based on the target precision; or
(b) the target criteria comprises a target probability value; the report indicates the one or more sets of consecutive classes that satisfy the target probability value; and the number of classes in each set is based on a sum of probability values associated with the set satisfying the target probability value.

27. The network entity of claim 26, wherein the target criteria comprises the target precision, wherein the report indicates, for each of the one or more sets of consecutive classes, the sum of probability values of each class of the set, and wherein the number of classes in each set is based on the target precision.

28. The network entity of claim 26, wherein the target criteria comprises the target probability value, wherein the report indicates the one or more sets of consecutive classes that satisfy the target probability value, and wherein the number of classes in each set is based on the sum of probability values associated with the set satisfying the target probability value.

* * * * *